(12) United States Patent
Nagai

(10) Patent No.: US 10,187,467 B2
(45) Date of Patent: Jan. 22, 2019

(54) INFORMATION PROCESSING SYSTEM AND METHOD OF PROCESSING INFORMATION

(71) Applicant: Kohta Nagai, Kanagawa (JP)

(72) Inventor: Kohta Nagai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 242 days.

(21) Appl. No.: 14/521,580

(22) Filed: Oct. 23, 2014

(65) Prior Publication Data
US 2015/0120857 A1 Apr. 30, 2015

(30) Foreign Application Priority Data

Oct. 29, 2013 (JP) .................................. 2013-223959
Oct. 22, 2014 (JP) .................................. 2014-215400

(51) Int. Cl.
*H04L 29/08* (2006.01)
*H04N 1/00* (2006.01)
*H04L 29/06* (2006.01)

(52) U.S. Cl.
CPC .......... *H04L 67/1097* (2013.01); *H04L 63/08* (2013.01); *H04L 67/06* (2013.01); *H04L 67/2819* (2013.01); *H04L 67/42* (2013.01); *H04N 1/00244* (2013.01); *H04L 67/30* (2013.01)

(58) Field of Classification Search
CPC ..... H04L 67/1097; H04L 63/08; H04L 67/06; H04L 67/2819; H04L 67/30; H04L 67/42; G06F 15/167; H04N 1/00244; H04N 1/00225; H04N 1/32534; H04N 1/32432
See application file for complete search history.

(56) References Cited

U.S. PATENT DOCUMENTS

| | | | | |
|---|---|---|---|---|
| 8,730,504 | B2 * | 5/2014 | Stokes | H04N 1/32432 358/1.15 |
| 9,514,291 | B2 * | 12/2016 | Fukuda | H04L 63/0807 |
| 10,063,725 | B2 * | 8/2018 | Nagai | H04N 1/00474 |

(Continued)

FOREIGN PATENT DOCUMENTS

| | | |
|---|---|---|
| JP | 2010-250552 | 11/2010 |
| JP | 2011-192250 | 9/2011 |

(Continued)

*Primary Examiner* — Ramy M Osman
(74) *Attorney, Agent, or Firm* — IPUSA, PLLC

(57) ABSTRACT

An information processing system including at least one computer includes a receiving unit that receives data input by an apparatus connected through a network and specifying information of specifying a storage destination of the data or other data generated based on the other data from a plurality of candidate storage destinations, the data and the specifying information being received from the apparatus; an intermediation unit that provides an interface common to the plurality of candidate storage destinations and sends the data or the other to the storage destination designated in a request received through the common interface; and a requesting unit that requests the intermediation unit through the common interface to send the data received by the receiving unit or the other data generated based on the data to the storage destination specified based on specifying information.

5 Claims, 37 Drawing Sheets

(56) References Cited

U.S. PATENT DOCUMENTS

| | | | |
|---|---|---|---|
| 2007/0074291 A1* | 3/2007 | Lee | H04N 1/00244 726/24 |
| 2007/0159652 A1* | 7/2007 | Sato | H04N 1/00225 358/1.15 |
| 2008/0307428 A1* | 12/2008 | Hagiwara | H04N 1/00127 718/106 |
| 2009/0251729 A1* | 10/2009 | Nakawaki | H04N 1/32101 358/1.15 |
| 2010/0002271 A1* | 1/2010 | Yamada | H04N 1/00225 358/448 |
| 2010/0005136 A1* | 1/2010 | Ferlitsch | G06F 17/30876 709/203 |
| 2010/0007928 A1* | 1/2010 | Kashioka | H04N 1/00225 358/474 |
| 2010/0070466 A1* | 3/2010 | Prahlad | G06F 3/0605 707/609 |
| 2011/0205586 A1 | 8/2011 | Takahashi et al. | |
| 2012/0113464 A1* | 5/2012 | Inoue | H04N 1/00244 358/1.15 |
| 2013/0194624 A1* | 8/2013 | Sweet | H04N 1/00225 358/1.15 |
| 2013/0215469 A1* | 8/2013 | Pizot | H04N 1/00225 358/1.15 |
| 2013/0242342 A1* | 9/2013 | Kawakami | H04N 1/00244 358/1.15 |
| 2013/0342866 A1* | 12/2013 | Hansen | H04N 1/00225 358/1.14 |
| 2014/0016165 A1* | 1/2014 | Ando | H04N 1/00244 358/403 |
| 2014/0040205 A1* | 2/2014 | Cometto | G06F 17/30194 707/639 |
| 2014/0122576 A1* | 5/2014 | Ohkuma | H04L 67/42 709/203 |
| 2014/0126016 A1* | 5/2014 | Namihira | H04N 1/32534 358/1.15 |
| 2014/0215021 A1* | 7/2014 | Nagai | H04L 67/06 709/219 |
| 2014/0223320 A1* | 8/2014 | Sugimura | H04L 67/2838 715/740 |
| 2015/0120857 A1* | 4/2015 | Nagai | H04L 67/1097 709/213 |
| 2015/0264129 A1* | 9/2015 | Takeuchi | H04L 67/1044 709/205 |
| 2016/0227069 A1* | 8/2016 | Osawa | G06F 17/30011 |

FOREIGN PATENT DOCUMENTS

| | | |
|---|---|---|
| JP | 5120121 | 1/2013 |
| JP | 2014-032659 | 2/2014 |

* cited by examiner

FIG.9

| ORGANI-ZATION ID | USER NAME (id) | PASS-WORD | ROLE | CARD ID | STORAGE ACCOUNT INFORMATION | PURCHASED APPLICATION |
|---|---|---|---|---|---|---|
| 123 | — | — | — | — | | SCANNING APPARATUS APPLICATION |
| 123 | A | ... | ADMINISTRATOR | card_a | StorageA, ⟨ID⟩, ⟨Password⟩ | |
| 123 | B | ... | USER | card_b | | |
| 123 | C | ... | USER | card_c | | |
| 123 | D | ... | USER | card_d | | |

12345, "AAA", "A4 COLOR MACHINE", "OFFICE XX"
67890, "BBB", "A2 COLOR MACHINE", "OFFICE YY"

| ORGANIZATION ID | MACHINE NO. | MACHINE NAME | MACHINE TYPE | LOCATION |
|---|---|---|---|---|
| 123 | 12345 | AAA | A4 COLOR MACHINE | OFFICE XX |
| 123 | 67890 | BBB | A2 COLOR MACHINE | OFFICE YY |
| .. | .. | .. | .. | .. |

FIG.13

```
"B", "password", "card_b"
"C", "password", "card_c"
"D", "password", "card_d"
```

FIG.18

| ORGAN-IZATION ID | PRO-FILE NAME | GROUP ||||| PROJECT ||||||
| --- | --- | --- | --- | --- | --- | --- | --- | --- | --- | --- | --- | --- |
| | | GROUP NAME | LAYOUT INFOR-MATION | INTERMEDIATION APPARATUS 1 || INTERMEDIATION APPARATUS 2 || PROJECT NAME | READING CONDITION | WORK INFOR-MATION | STORAGE COLLABO-RATION INFORMATION | STORAGE COLLABO-RATION SOURCE |
| | | | | ADDRESS | PASSWORD | ADDRESS | PASSWORD | | | | | |
| 123 | A4pf | SALES | ⋯ | test1.co.jp | ⋯ | test2.co.jp | | DAILY REPORT | DOUBLE SIDES, 300dpi,jpeg | OCR | StorageA, /DAILY REPORT | SERVICE PROVIDING APPARATUS |
| | | | | | | | | CUSTOMER INFOR-MATION | SINGLE SIDE, 600dpi,pdf | — | StorageA, /CUSTOMER INFORMATION | SERVICE PROVIDING APPARATUS |
| | | | | | | | | MERCHAN-DISE INFOR-MATION | SINGLE SIDE, 600dpi,pdf | — | StorageA, /MERCHANDISE INFORMATION | SERVICE PROVIDING APPARATUS |
| | | | | | | | | CHECK | SINGLE SIDE, 600dpi,pdf | — | StorageA, /CHECK | SERVICE PROVIDING APPARATUS |
| | | | | | | | | SHIPPING INFOR-MATION | SINGLE SIDE, 600dpi,pdf | ⋯ | StorageC, /SHIPPING INFORMATION | INTERME-DIATION APPARATUS 1 |
| | | DEVEL-OPMENT | ⋯ | ⋯ | | ⋯ | | ⋯ | ⋯ | ⋯ | ⋯ | ⋯ |
| 123 | A2pf | ⋯ | ⋯ | ⋯ | | ⋯ | | ⋯ | ⋯ | ⋯ | ⋯ | ⋯ |

FIG.20

| MACHINE NO. | PROFILE NAME | APPLICATION ID |
|---|---|---|
| 12345 | A4pf | SCANNING APPARATUS APPLICATION |
| 67890 | A2pf | SCANNING APPARATUS APPLICATION |
| : | : | : |

| STATUS | SCHEDULED RECOVERY |
|---|---|
| IN-SERVICE | – |

FIG.22B

| STATUS | SCHEDULED RECOVERY |
|---|---|
| UPDATING | 2013/8/11 11:00 |

| ORGANIZATION ID | STORAGE NAME |
|---|---|
| 123 | StorageC |
| 456 | StorageD |
| : | : |

FIG.27

| ORGANIZATION ID | PASSWORD |
|---|---|
| 123 | ･･････ |
| 456 | ･･････ |
| ⋮ | ⋮ |

"CUSTOMER INFORMATION" , "TAROU YAMADA",
"ORDER DATE", "2013/08/13",

FIG.29

| ORGANI-ZATION ID | STORAGE NAME | FILE PATH | ADDRESS | PASSWORD | UPLOAD DATE | FILE ID |
|---|---|---|---|---|---|---|
| 123 | StorageC | /SHIPPING INFORMATION/20130801xxxx.txt | test1.co.jp | ..... | ...... | 1234555 |
| 123 | StorageC | /SHIPPING INFORMATION/20130801xxyy.txt | test1.co.jp | ..... | ...... | 1234556 |
| .. | .. | .. | | | | .. |

236

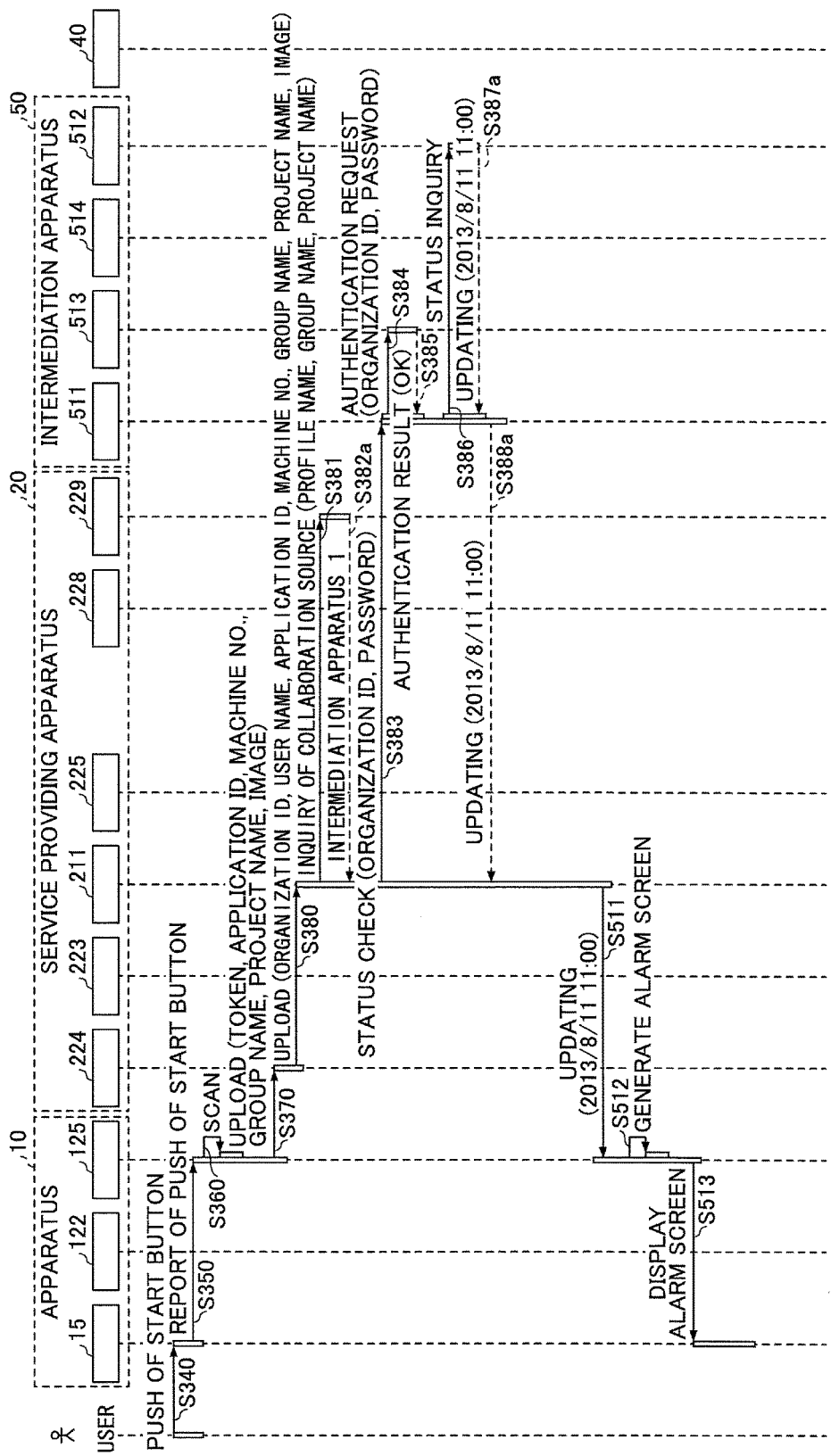

FIG.36

| ADDRESS | ORGANIZATION ID | PASSWORD |
|---|---|---|
| test1.co.jp | 123 | ••••••• |
| test1.co.jp | 456 | ••••••• |
| ⋮ | ⋮ | ⋮ |
| test2.co.jp | 123 | ••••••• |
| test2.co.jp | 777 | ••••••• |
| ⋮ | ⋮ | ⋮ |

62

INFORMATION PROCESSING SYSTEM AND METHOD OF PROCESSING INFORMATION

BACKGROUND OF THE INVENTION

1. Field of the Invention

The present invention relates to an information processing system and a method of processing information.

2. Description of the Related Art

There is provided a cloud service by which image data obtained by scanning an original using an image forming apparatus or data obtained by processing the above image data are stored in a predetermined online storage or the like. Specifically, the image forming apparatus sends the image data obtained by scanning the original to a server on the side of the cloud. The server performs a process such as an optical character recognition (OCR) to the image data in conformity with setup information set up by a user, and the data generated as a processing result is sent to a predetermined online storage or the like.

Patent Document 1: Japanese Laid-Open Patent Publication No. 2011-192250

SUMMARY OF THE INVENTION

It is an object of an embodiment of the present invention to improve flexibility of sending the data sent from the apparatus to a storage destination.

One aspect of the embodiments of the present invention may be to provide an information processing system including at least one computer, including a receiving unit that receives data input by an apparatus connected through a network and specifying information of specifying a storage destination of the data or other data generated based on the other data from a plurality of candidate storage destinations, the data and the specifying information being received from the apparatus; an intermediation unit that provides an interface common to the plurality of candidate storage destinations and sends the data or the other data to the storage destination designated in a request received through the common interface; and a requesting unit that requests the intermediation unit through the common interface to send the data received by the receiving unit or the other data generated based on the data to the storage destination specified based on specifying information.

Additional objects and advantages of the embodiments will be set forth in part in the description which follows, and in part will be clear from the description, or may be learned by practice of the invention. Objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

BRIEF DESCRIPTION OF THE DRAWINGS

FIG. 9 illustrates an exemplary structure of a user information memory unit;

FIG. 10 illustrates an exemplary description of apparatus information in an apparatus information file;

FIG. 11 illustrates an exemplary structure of an apparatus information memory unit;

FIG. 13 illustrates an exemplary description of user information in a user information file;

FIG. 18 illustrates a structural example of a profile memory unit;

FIG. 20 illustrates a structural example of a profile apparatus correspondence memory unit;

FIGS. 22A and 22B illustrate a structural example of status information;

FIG. 23 illustrates an exemplary structure of a collaboration information memory unit;

FIG. 27 illustrates an exemplary structure of an organization authentication information memory unit included in an intermediation apparatus;

FIG. 28 illustrates an example of meta-information;

FIG. 29 illustrates an exemplary structure of an upload information memory unit;

FIGS. 31A and 31B are a sequence chart for explaining a third example of the procedure at the time of using the ScanToStorage service;

FIG. 36 illustrates an exemplary structure of an organization authentication information memory unit included in an authentication apparatus.

DETAILED DESCRIPTION OF THE PREFERRED EMBODIMENTS

Each of online storages has its own interface (an Application Program Interface (API)). Said differently, formats of data transmission requests to the online storages may mutually differ. When multiple online storages are candidates of a storage destination of data, a server sending the data to the online storage selected from the multiple online storages is required to have an implementation corresponding to each online storage.

However, the types of the online storages provided in the market are uncertain. Therefore, there may occur needs to use a new online storage as a storage destination.

In this case, it is necessary to provide an operation for adding the implementation for the new online storage to the server. During the operation, the server is stopped from servicing and users cannot be provided with the service while the server is stopped, A description is given below, with reference to the FIG. 1 through FIG. 36 of embodiments of the present invention. Where the same reference symbols are attached to the same parts, repeated description of the parts is omitted.

Reference symbols typically designate as follows:
1: information processing system;
10: apparatus;
11: controller;
12: scanner;
13: printer;
14: modem;
15: operation panel;
16: network interface;
17: SD card slot;
20: service providing apparatus;
30: administrator terminal;
40: online storage system;
50: intermediation apparatus;
53: intermediation API;
60: authentication apparatus;
61: authentication processing unit;
62: organization authentication information memory unit;
80: SD card;
111: CPU;
112: RAM;
113: ROM;
114: HDD;
115: NVRAM;
121: apparatus control unit;
122: apparatus authentication unit;
123: communication unit;
124: display control unit;
125: scanning apparatus application;
200: drive device;
201: recording medium;
202: auxiliary memory device;
203: memory device;
204: CPU;
205: interface device;
210: server application;
211: scan server application;
220: platform;
221: setup registration unit;
222: apparatus communication unit;
223: authentication processing unit;
224: session administration unit;
225: job processing unit;
226: OCR processing unit;
227: upload processing unit;
228: storage collaboration unit;
229: collaboration source determining unit;
231: user information memory unit;
232: apparatus information memory unit;
223: apparatus application memory unit;
234: profile memory unit;
235: profile apparatus correspondence memory unit;
236: upload information memory unit;
240: platform API;
511: collaboration intermediation unit;
512: status administration unit;
513: authentication processing unit;
514: meta information generation unit;
521: status information memory unit;
522: collaboration information memory unit;
523: organization authentication information memory unit;
524: meta information memory unit; and
B: bus.

First Embodiment

Figure 1:
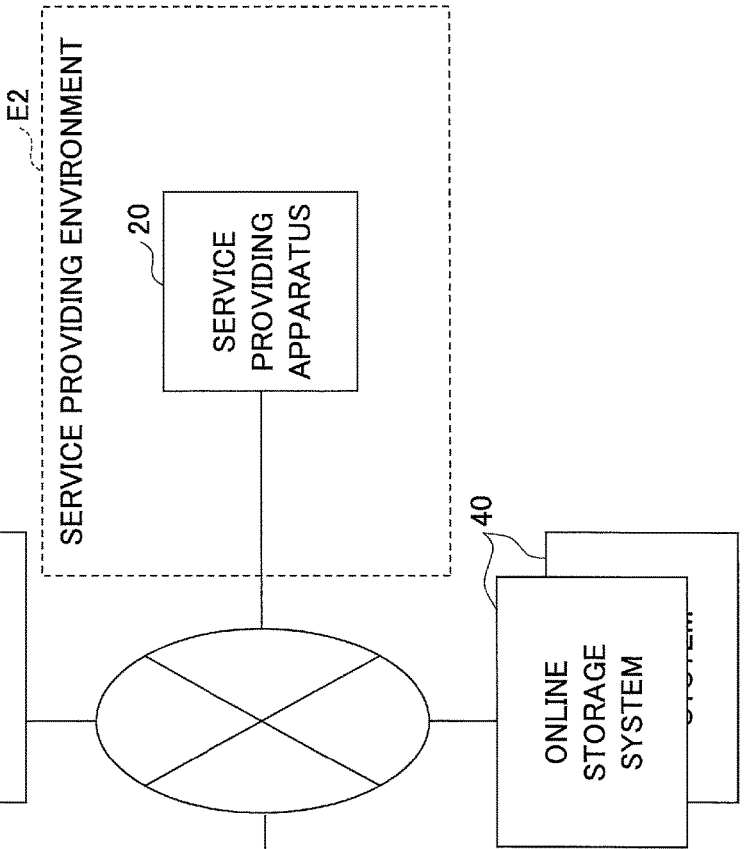
FIG. 1 illustrates an exemplary structure of an information processing system of a first embodiment 1.

In the information processing system 1 illustrated in FIG. 1, a service providing environment E2 can be communicated with a user environment E1 through a wide area network such as the Internet. The service providing apparatus 20 can be communicated with the intermediation apparatus 50 through a network such as a local area network (LAN) or a network such as the Internet. Further, the service providing apparatus 20, the intermediation apparatus 50, and the online storage system 40 can be communicated through a network such as a LAN, the Internet, or the like.

The service providing environment E2 is a system environment in an organization which provides a cloud service via the network. Within this embodiment, the cloud service is specifically described. However, the embodiment can be applied to a service provided through the network such as a service provided by an application service provider (ASP), a Web service, and so on.

The service providing environment E2 includes a service providing apparatus 20. The service providing apparatus 20 provides a predetermined service through the network. One of the services provided by the service providing apparatus 20 is a "ScanToStorage service". Within this embodiment, the ScanToStorage service is described. The ScanToStorage service stores image data scanned by an apparatus 10 in the user environment E1 in a predetermined storage destination. Said differently, the service providing apparatus 20 may be installed in the user environment E1. Said differently, the service providing environment E2 may be included in the user environment E1.

The user environment E1 is a system environment of the apparatus 10 in an organization of a user enterprise or the like. In the user environment E1, at least one apparatus 10 is connected to an administrator terminal 30 through a network such as a Local Area Network (LAN) or the like.

The apparatus 10 of the embodiment is an image forming apparatus having a scan function. The apparatus 10 may be a multifunction peripheral having print, copy, or facsimile (FAX) communication functions in addition to the scan function.

The administrator terminal 30 is used by an administrator of the image forming apparatus 10 in the user environment E1. An example of the administrator terminal 30 is a personal computer (PC), a personal digital assistance (PDA), a tablet-type terminal, a smart phone, a mobile phone, or the like.

The online storage system 40 is a computer system providing a cloud service called an "online storage" through the network. The online storage is a service of lending a memory area of a storage. In the embodiment, the memory area lent by the online storage is a candidate for a storage destination of image data in a ScanToStorage service provided by the service providing apparatus 20.

The intermediation apparatus 50 is a computer that intermediates an upload of data by the service providing apparatus 20 to the online storage system 40. Specifically, the intermediation apparatus 50 absorbs a difference among inherent or individual interfaces (e.g., an application program interface (API)) for each online storage system 40, and provides the common interface (e.g., API) to the service providing apparatus 20. As a result, the service providing apparatus 20 can upload the data to each online storage system 40 through the intermediation apparatus 50 even if the service providing apparatus 20 does not recognize an interface inherent in each online storage system 40. The intermediation apparatuses 50 collaborate with or correspond to different online storage systems 40. However, the online storage systems 40 collaborating with the intermediation apparatuses 50 may overlap. For example, the intermediation apparatuses 50 uploading the data to the same online storage system 40 may be provided with each user (each organization) using the ScanToStorage service. For example, this mode is effective when the intermediation apparatus 50 is caused to perform a process inherent in each user at a time of uploading the data.

One intermediation apparatus 50 may collaborate with multiple online storage systems 40. The intermediation apparatus 50 and the service providing apparatus 20 may be substantialized by one computer or one computer system. Further, the intermediation apparatus 50 may be installed in the server environment E2 or the user environment E1. Further, the intermediation apparatus 50 may be provided in a country different from a country where the service providing apparatus 20 is located. With this, even if the service providing apparatus 20 is provided in each country or each region, multiple service providing apparatuses 20 can use the intermediation apparatus located in a certain country in common.

Figure 2:
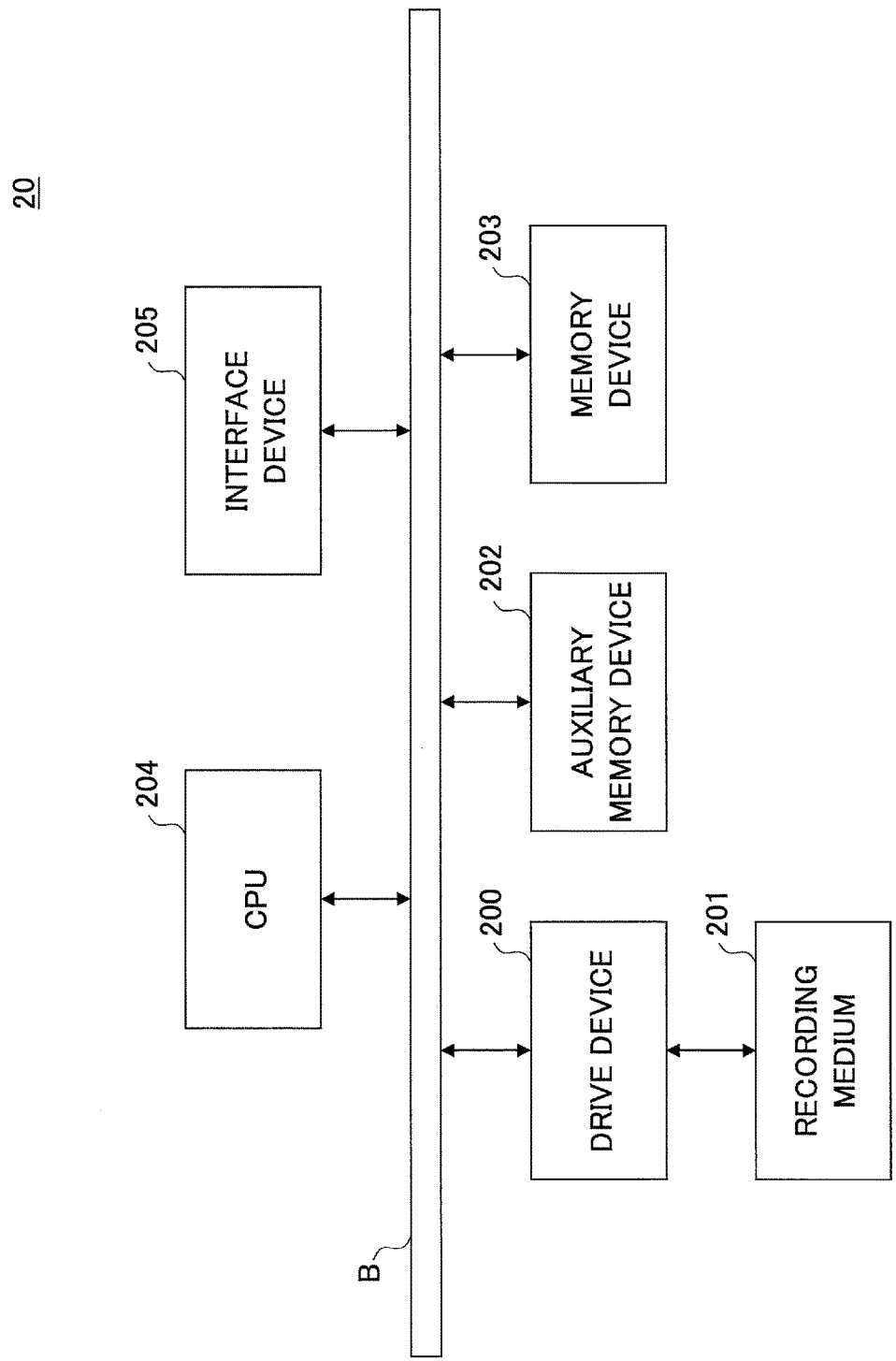
FIG. 2 illustrates an exemplary hardware structure of a service providing apparatus of the first embodiment.

FIG. 2 illustrates an exemplary hardware structure of the service providing apparatus of the first embodiment. The service providing apparatus 20 includes a drive device 200, an auxiliary memory device 202, a memory device 203, a CPU 204 and an interface device 205, which are mutually connected through a bus B.

A program substantializing processes in the service providing apparatus 20 is supplied by a recording medium 201 such as CD-ROM. When the recording medium 201 having the program recorded on it is installed in the drive device 200, the program is installed on the auxiliary memory device 202 through the drive device 200 from the recording medium 201. However, the program may not always be installed from the recording medium 201 and may be downloaded from another computer through the network. The auxiliary memory device 202 stores necessary files, data, and so on in addition to the installed program.

The memory device 203 reads out the program from the auxiliary memory device 202 when the program is instructed to be invoked and stores the read program into the memory device 203. The CPU 204 substantializes a function related to the service providing apparatus 20 in conformity with the program stored in the memory device 203. The interface device 205 is used as an interface for connecting to the network.

The service providing apparatus 20 may be formed by multiple computers including hardware illustrated in FIG. 2. Said differently, processes performed by the service providing apparatus 20 described below may be distributed and executed by multiple computers. The intermediation apparatus 50 may include hardware illustrated in FIG. 2 or may be formed by multiple computers each having the hardware illustrated in FIG. 22.

Figure 3:
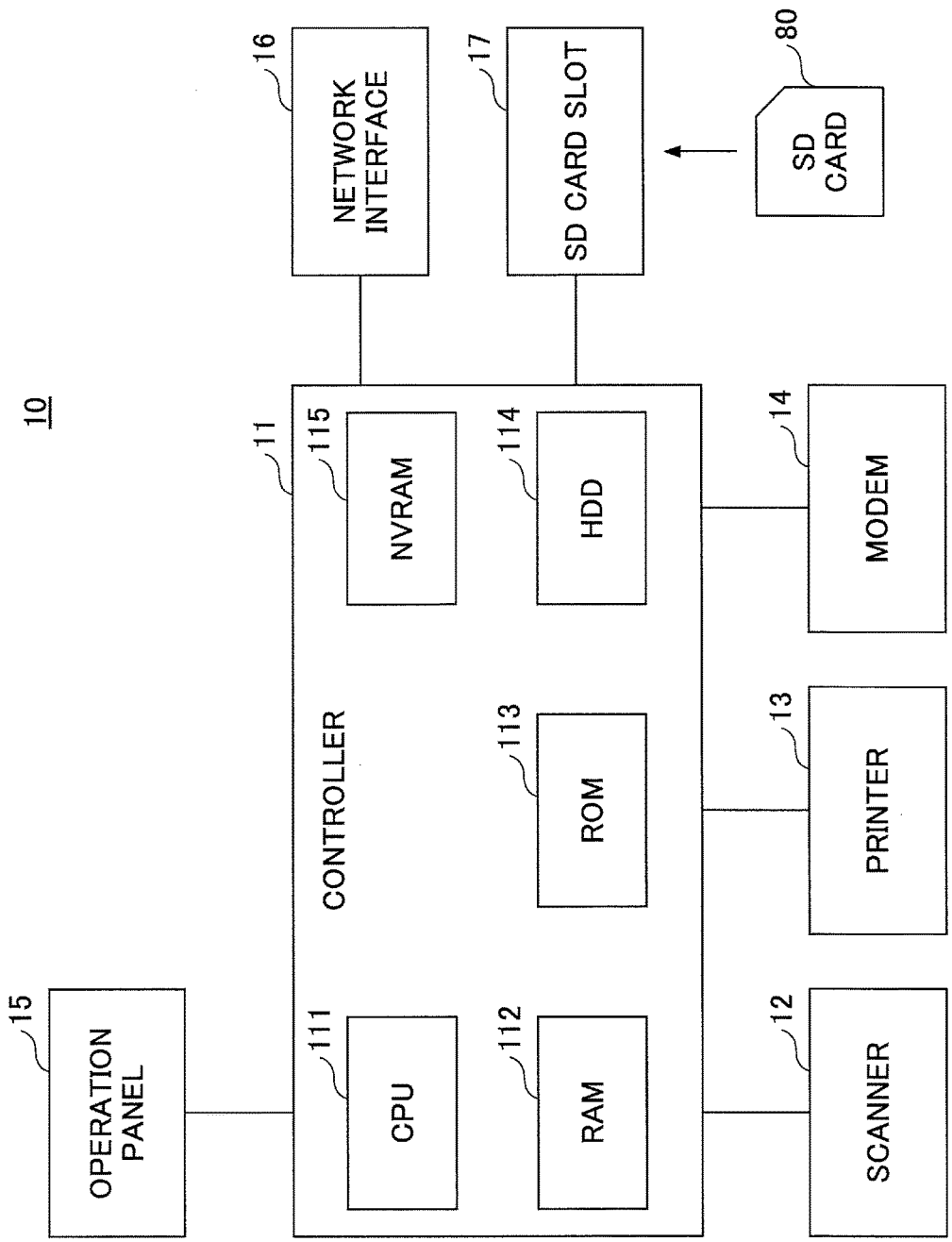
FIG. 3 illustrates an exemplary hardware structure of an apparatus of the first embodiment.

FIG. 3 illustrates an exemplary hardware structure of the apparatus of the first embodiment. Referring to FIG. 3, the apparatus 10 includes hardware such as a controller 11, a scanner 12, a printer 13, a modem 14, an operation panel 15, a network interface 16, and an SD card slot 17.

The controller 11 includes a CPU 111, a RAM 112, a ROM 113, an HDD 114, an NVRAM 115, and so on. Various programs and data used by the programs are stored in the ROM 113. The RAM 112 is used as a memory area for loading the programs, a work area for the loaded programs, or the like. The CPU 111 substantializes various functions by processing the program loaded into the RAM 112. The HDD 114 stores programs, various data used by the programs, or the like. The NVRAM 115 stores various setup information or the like.

The scanner 12 is hardware (an image reading unit) for reading image data from an original (an original manuscript). The printer 13 is hardware (a printing unit) for printing print data on a print paper. The modem 14 is hardware for connecting the apparatus 10 to a telecommunication line and is used for sending and receiving the image data with fax communications. The operation panel 15 is hardware provided with an input unit for receiving an input from the user such as a button, a display unit such as a liquid crystal panel, or the like. The network interface 16 is hardware for connecting the apparatus 10 to a wired or wireless network such as LAN. The SD card slot 17 is used to read a program stored in an SD card 80. Said differently, not only the programs stored in the ROM 113 but also the programs stored in the SD card 80 may be loaded into the RAM 112 and executed by the apparatus 10. The SD card 80 may be substituted by another recording medium such as a CD-ROM and a universal serial bus (USB) memory. The type of the recording medium such as the SD card 80 is not specifically limited to a predetermined kind. In this case, the SD card slot 17 may be replaced by hardware depending on kinds of the recording medium.

Figure 4:
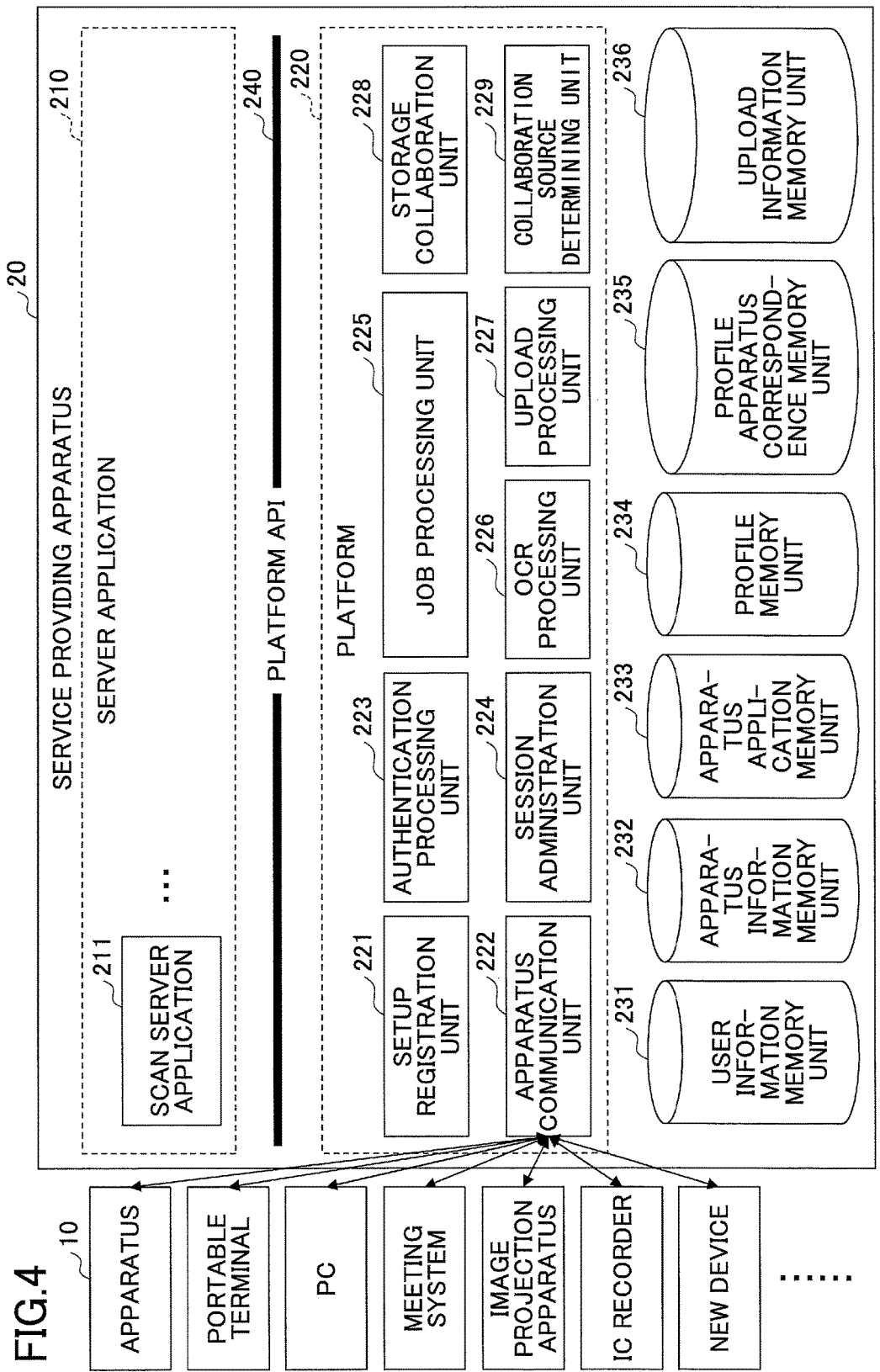
FIG. 4 illustrates an exemplary functional structure of a service providing apparatus of the first embodiment.

FIG. 4 illustrates an exemplary functional structure of the service providing apparatus of the first embodiment. Referring to FIG. 4, the service providing apparatus 20 includes software such as a server application 210 or a platform 220. The server application 210, the platform 220, and so on are formed by at least one program installed in the service providing apparatus 20 and causes the CPU to perform a predetermined process.

The service providing apparatus 20 uses a user information memory unit 231, an apparatus information memory unit 232, an apparatus application memory unit 233, a profile memory unit 234, a profile apparatus correspondence memory unit 235, an upload information memory unit 236, or the like. The user information memory unit 231, the apparatus information memory unit 232, the apparatus application memory unit 233, the profile memory unit 234, the profile apparatus correspondence memory unit 235, the upload information memory unit 236 and so on can be substantialized by the auxiliary memory device 202, a memory device, or the like connected to the service intermediation apparatus 200 through a network.

The server application 210 is an application program which realizes a service provided by the service providing apparatus 20. However, the service is not completely provided by only the server application 210. By the collaboration of the server application 210 and the apparatus 10, the service is completely provided. Further, there is a service completely provided by a collaboration with another cloud service such as the online storage. The terminology of "server application" is used, for convenience to distinguish from an application program (e.g., a scanning apparatus application 125, described below) that is required to be installed on a side of the apparatus 10 so that the application program on the side of the service providing apparatus 20 collaborates with the server application 210.

Referring to FIG. 4, a scan server application 211 is designated as an example of the server application. The scan server application 211 is the server application that performs a process related to the ScanToStorage service 210.

The platform 220 includes a function commonly used by multiple server applications 210, a basic function used by the multiple server applications 210, or the like. Referring to FIG. 4, the platform 220 includes a setup registration unit 221, an apparatus communication unit, an authentication processing unit 223, a session administration unit 224, a job processing unit 225, an OCR processing unit 226, an upload processing unit 227, a storage collaboration unit 228, a collaboration source determining unit 229, or the like. Functions of these units are unveiled for the server application 210 through the platform API 240. Said differently, the server application 210 can use the functions of these units within a range unveiled by the platform API 240.

The setup registration unit 221 performs a setup registration process required at a time of starting to use a service provided by a service providing apparatus 20 such as the ScanToStorage service. By the setup registration unit 221, information is registered to the user information memory unit 231, the apparatus information memory unit 232, the profile memory unit 234, and the profile apparatus correspondence memory unit 235.

The service information memory unit 231 stores information related to a service served by the service providing apparatus 20. The apparatus information memory unit 232 stores information related to the apparatus 10 collaborating with the service served by the service providing apparatus 20 in a system environment (i.e., the user environment E1) for the user. Said differently, the service provided by the service providing apparatus 20 such as the ScanToStorage service is substantialized by the collaboration with the apparatus 10 in the user environment E1.

The apparatus application memory unit 233 stores an application program (hereinafter, referred to as an "apparatus application") which is required to be installed in the apparatus so that the server application 210 collaborates with the apparatus 10. The profile memory unit 234 stores a profile. The profile includes structural information of an operation screen of an apparatus application, information related to a process performed in response to an operation on an operation screen, or the like. The profile apparatus correspondence memory unit 235 stores correspondence information between the profile and the apparatus. Said differently, it is possible to associate different profiles to the apparatuses 10 in the operation screen for the same apparatus application.

The apparatus communication unit 222 controls a communication with the apparatus 10. The authentication processing unit 223 performs an authentication of a user of the administrator terminal 30 or a user of the apparatus 10 or the like. Further, the authentication processing unit 223 alternatively performs a login process of log in the online storage system 40 at a time of executing the ScanToStorage service, for example. The session administration unit 224 administrates a communication session when the service providing apparatus 20 and the apparatus 10 collaborate.

The job processing unit 225 uses the OCR processing unit 226 or the upload processing unit 227, for example, to control the execution of the job required from the server application 210. The OCR processing unit 226 executes an OCR process for the image data to be processed in a case where the job required from the server application 210 is an OCR process. The upload processing unit 227 executes upload in a case where the job required from the server application is the upload of the data through the network. Storage of the data in the online storage system 40 is one mode of the upload. The upload information memory unit 236 stores identification information used in an upload destination or the like for each data uploaded into the online storage system 40. This identification information is used to check a status of the data related to the identification information in the upload destination.

The storage collaboration unit 228 accesses the online storage system 40. The collaboration source determining unit 229 determines whether the upload source of the data to the online storage system 40 is the service providing apparatus or the intermediation apparatus 50 for each executable unit of the ScanToStorage service. Said differently, within the embodiment, an upload mode of uploading the data to the online storage system 40 includes an upload mode of uploading by the service providing apparatus 20 and an uploading mode of uploading through the intermediation apparatus 50.

Figure 5:
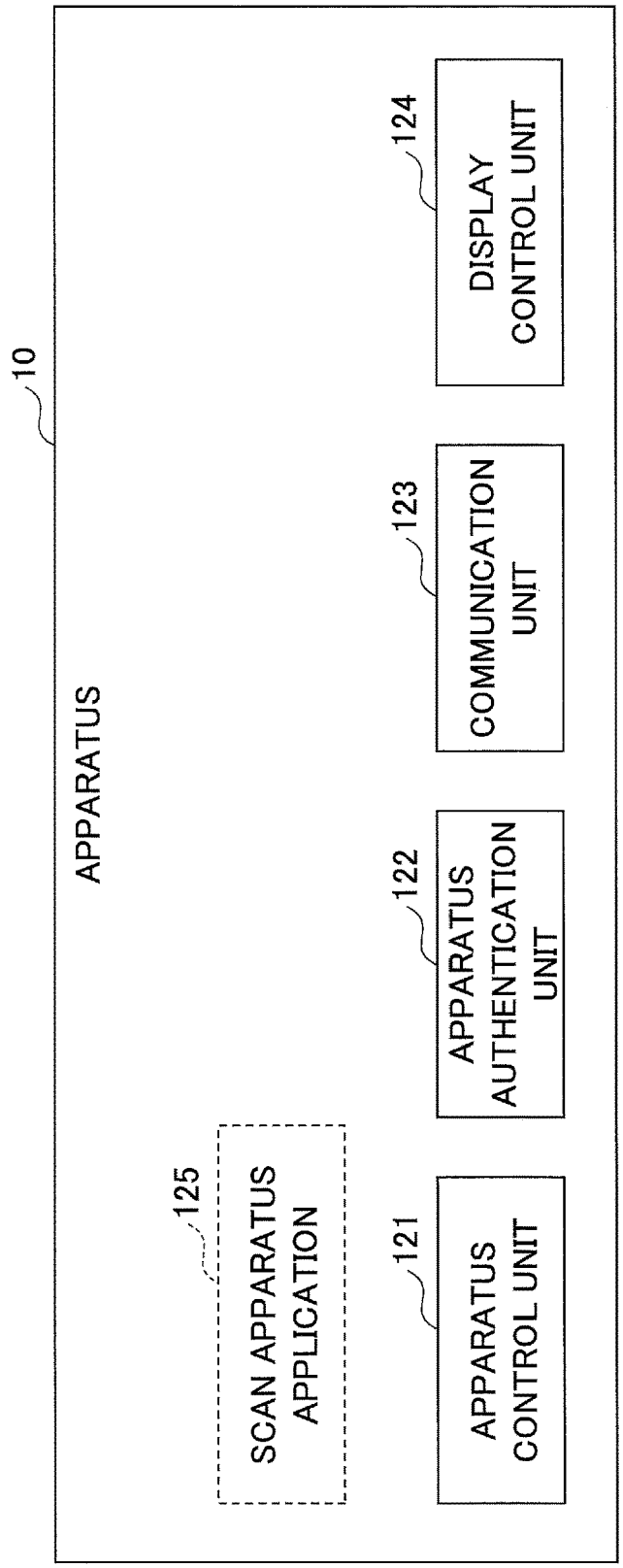
FIG. 5 illustrates an exemplary functional structure of the apparatus of the first embodiment.

FIG. 5 illustrates an exemplary functional structure of the apparatus of the first embodiment. Referring to FIG. 5, the apparatus 10 includes an apparatus control unit 121, an apparatus authentication unit 122, a communication unit 123, a display control unit 124, and so on. These units are substantialized when one or more programs installed in the apparatus 10 are executed by the CPU 111.

The apparatus controlling unit 121 controls hardware of the apparatus 10. The apparatus authentication unit 122 performs a process for authenticating an operator of the apparatus 10. The communication unit 123 controls a communication through the network. The display control unit 124 performs a display of a screen or the like on the operation panel 15.

Referring to FIG. 5, the scanning apparatus application 125 is indicated by a broken line. The scanning apparatus application 125 is one of the apparatus applications and is installed on the apparatus 10 so that the apparatus 10 collaborates with the service providing apparatus 20 in the ScanToStorage services. It is sufficient that the apparatus application can be installed on the apparatus 10. The apparatus application functioning as the apparatus application and further functioning as the server application may be installed on the apparatus 10 as the apparatus application.

Within the embodiment, the scanning apparatus application 125 is not originally installed on the apparatus 10, and is installed on the apparatus 10 in a preparation operation for using the ScanToStorage service. Because of this, the scanning apparatus application 125 is indicated by using the broken line. However, the scanning apparatus application 125 may be originally installed on the apparatus 10.

Figure 6:
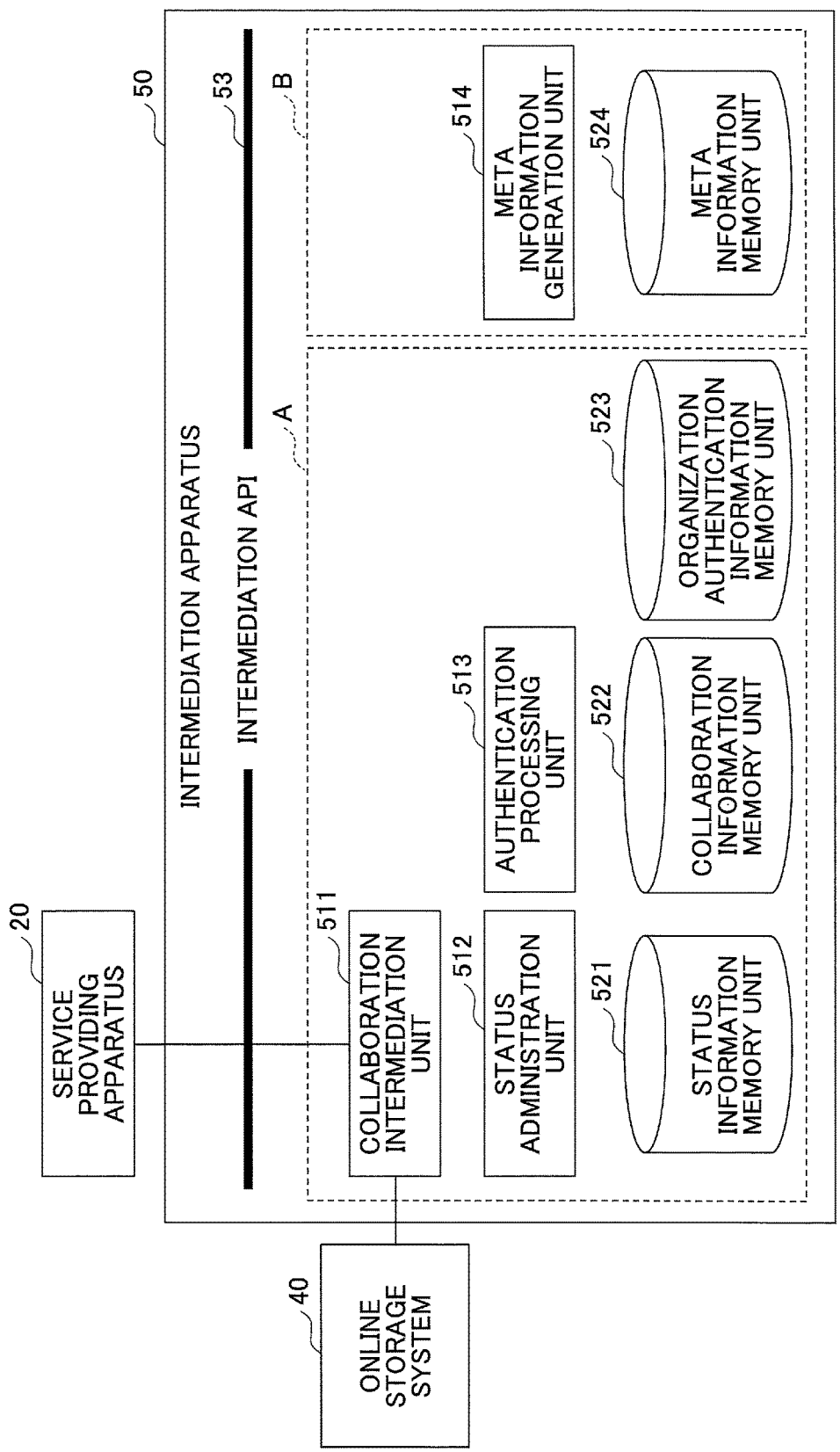
FIG. 6 illustrates an exemplary functional structure of an intermediation apparatus of the first embodiment.

FIG. 6 illustrates an exemplary functional structure of the intermediation apparatus of the first embodiment. Referring to FIG. 6, the intermediation apparatus 50 includes a collaboration intermediation unit 511, a status administration unit 512, an authentication processing unit 513, a meta information generation unit 514, or the like. These units are substantialized when a program installed in the intermediation apparatus 50 are executed by the CPU of the intermediation apparatus 50. The intermediation apparatus 50 uses a status information memory unit 521, a collaboration information memory unit 522, an organization authentication information memory unit 523, a meta information memory unit 524, and so on. These units are substantialized using an auxiliary memory device included in the intermediation apparatus 50, a memory device connected to the intermediation apparatus 50 through the network.

The collaboration intermediation unit 511 intermediates the collaboration between the service providing apparatus 20 and the online storage system 40. Specifically, the collaboration intermediation unit 511 receives a request from the service providing apparatus 20 through an intermediation API 53, which is an API used in common inside the intermediation apparatus 50. The collaboration intermediation unit 511 converts the request to a request having a format corresponding to the API inherent in the online storage system 40, which collaborates with the intermediation apparatus 50, and sends the converted request to the online storage system 40. The collaboration intermediation unit 511 converts the response from the online storage system 40 to the format corresponding to the intermediation API 53. The converted response is returned to the service providing apparatus 20.

The intermediation API 53 may be an API based on, for example, a HyperText Transfer Protocol (HTTP) such as Representational State Transfer (REST) or an API using Remote Procedure Call (RPC) such as Simple Object Access Protocol (SOAP). An API having another format may be used.

The collaboration information memory unit 522 stores information indicative of the collaboration destination of the intermediation apparatus 50, said differently a correspondence between the intermediation apparatus 50 and the online storage system 40.

The status administration unit 512 determines a status of the intermediation apparatus 50. As an example of the status of the intermediation apparatus 50, running, updating, or the like can be mentioned. The running is a status where the function of the intermediation apparatus 50 can be normally provided. The updating is, for example, a status where a new function is being implemented for the intermediation apparatus 50 (for example, a new program is being installed) and the function of the intermediation apparatus 50 cannot be normally provided. The status information memory unit 521 stores information indicative of the status of the intermediation apparatus 50.

The authentication processing unit 513 performs an authentication process for giving a call authority for calling the intermediation API 53. The organization authentication information memory unit 523 stores information used by the authentication processing unit 513 to authenticate a call source of the intermediation API 53.

The meta information generation unit 514 forms a meta-information file having a predetermined format using the given text information. The meta information memory unit 524 stores the meta-information file generated by the meta information generation unit 514.

A portion surrounded by a rectangle A depicted by broken lines is included in each intermediation apparatus 50. However, the contents of the implementation of the part differs depending on the online storage system 40 or the like of the collaboration destination. On the other hand, a portion surrounded by a rectangle B depicted by broken lines is inherent in a user (an organization) using the intermediation apparatus 50. Said differently, the intermediation apparatus 50 illustrated in FIG. 6 corresponds to a user need of requiring a process of generating the meta-information from text data extracted by an OCR from image data obtained by scanning in the apparatus 10.

Hereinafter, the procedure performed by the information processing system 1 is described. In order to enable to use the ScanToStorage service in the user environment E1, a preparation operation such as a registration of various information related to the user environment E1 for the service providing apparatus 20, an installation of the scanning apparatus application 125 onto the apparatus 10, or the like. Therefore, a procedure performed along with the preparation operation is described. The preparation operation is performed by an administrator (hereinafter, simply an "administrator") of the apparatus 10 in the user environment E1.

Figure 7:
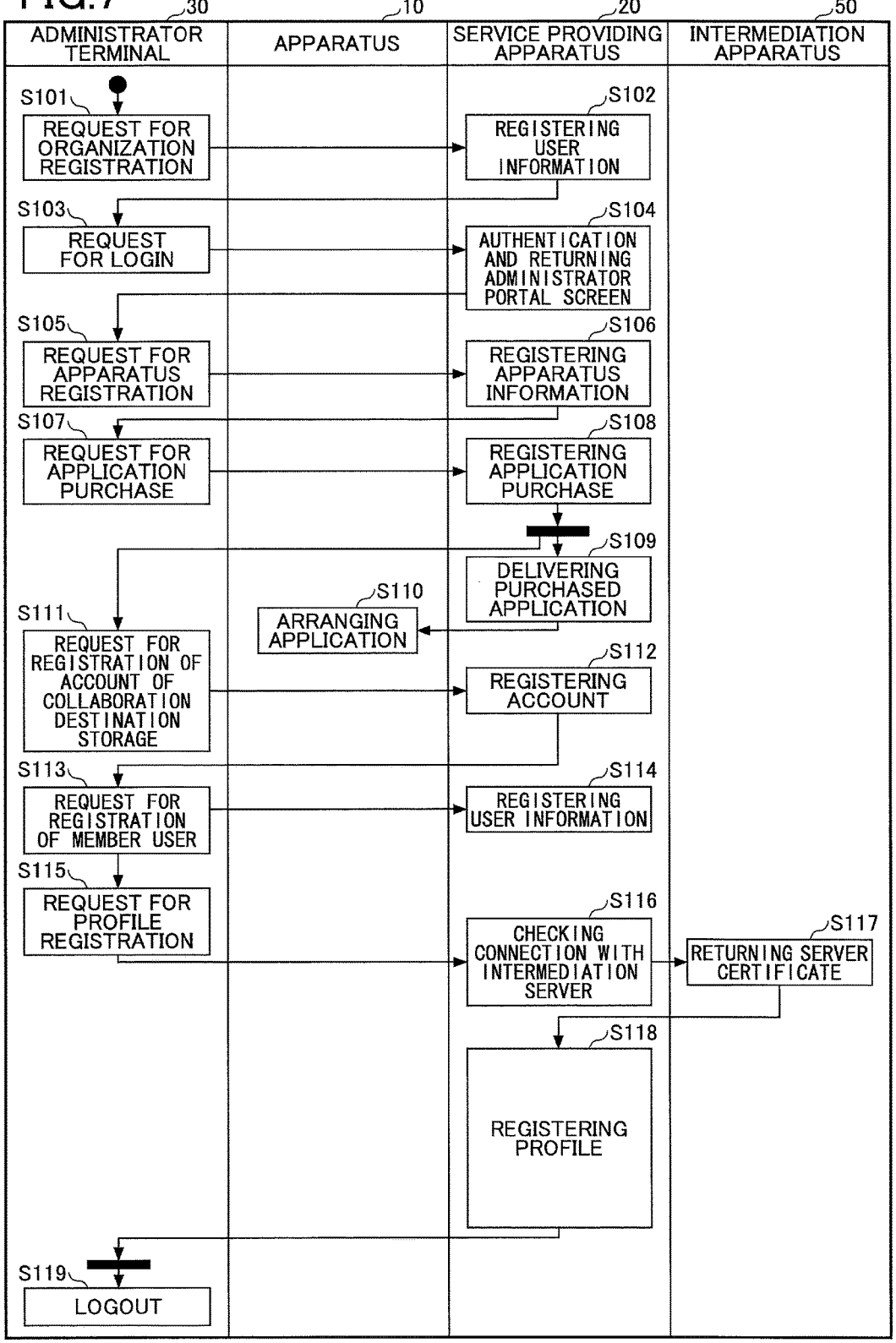
FIG. 7 illustrates an exemplary procedure performed along with a preparation operation.

FIG. 7 illustrates an exemplary process performed along with a preparation operation.

In step S101, the administrator terminal 30 sends a request for organization registration to the service providing apparatus 20 in response to an instruction input by the administrator. The request for organization registration requests a registration of information related to an organization using a service provided by the service providing apparatus 20. The request for organization registration is instructed through, for example, the following screen.

Figure 8:
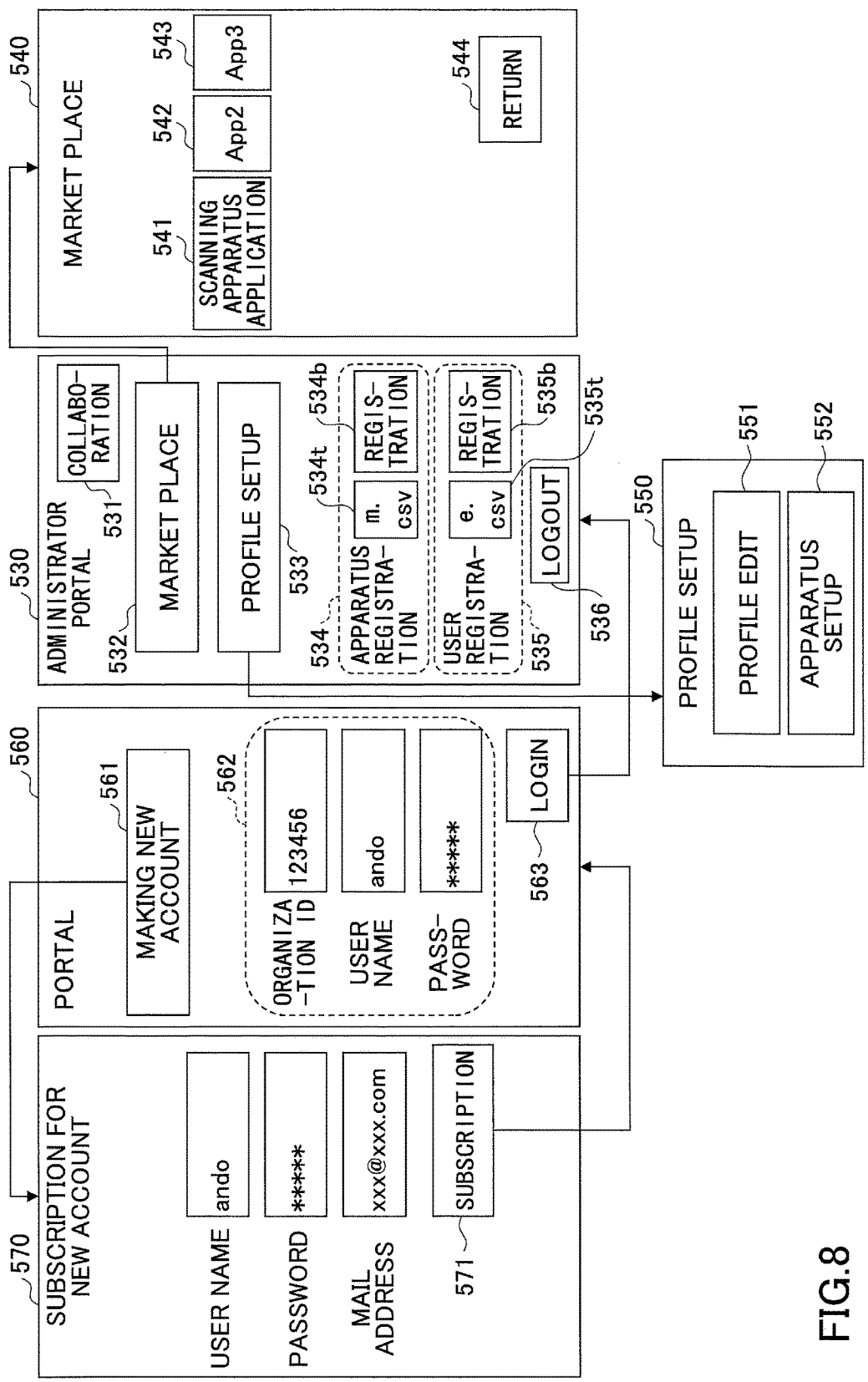
FIG. 8 illustrates an exemplary screen transition displayed on an administrator terminal at a time of the preparation operation.

FIG. 8 illustrates an exemplary screen transition displayed on an administrator terminal at a time of the preparation operation. At a time of starting the preparation operation, a portal screen 560 (FIG. 8) is displayed on the administrator terminal 30. The portal screen 560 is an entrance for a service provided by the service providing apparatus 20. Various screens illustrated in FIG. 8 are displayed based on a Web page including HTML data provided by, for example, the service providing apparatus 20. Although it is omitted in the following description for convenience, a HyperText Transfer Protocol (HTTP) communication is performed between the administrator terminal 30 and the service providing apparatus 20 at a time of transiting to the screens.

The portal screen 560 includes a button 561 for making a new account, a login information input area 562, a login button 563, and so on.

In a case where the organization registration is performed, the administrator pushes the button 561 for making the new account. When the administrator pushes the button 561 for making the new account, a screen 570 for subscription for a new account is displayed on the administrator terminal 30. Referring to FIG. 8, each arrow from one screen to another screen designates a transition of an object to be displayed to the other screen by the pushing of the button.

In the screen 570 for the subscription for the new account, when the user name, the password, and the mail address of the administrator are input and a subscription button 571 is pushed, the administrator terminal 30 sends a request for organization registration including the user name, the password, the mail address, and so on to the service providing apparatus 20.

When the request for the organization registration is received by the service providing apparatus 20, the setup registration unit 221 registers information or the like including in the request for the organization registration into the user information memory unit 231 (step S102).

FIG. 9 illustrates an exemplary structure of the user information memory unit 231. Referring to FIG. 9, each record of the user information memory unit 231 includes items such as an organization ID, a user name, a password, a role, a card ID, storage account information, a purchased application, and so on.

The organization ID is an identifier allocated for each user environment E1, namely each organization such as an enterprise user using a service provided by the service providing apparatus 20. The user name, the password, the role, and the card ID are of an individual user (hereinafter, referred to as a "member user") who are a member of an organization indicated by the organization ID.

The role is an item for identifying the administrator out of the member users. Said differently, the "administrator" is registered in the member user who is the administrator, and the "user" is registered in the member user other than the administrator. The card ID is an identifier of an IC card used when the member user logs in the apparatus 10. The storage account information is account information for the online storage used by the organization indicated by the organization ID. This account information is used as authorization information presented to the online storage system 40 at a time of storing the image data scanned by the apparatus 10 in the online storage system 40. The purchased application is a list of an identifier (hereinafter, an "application ID") purchased by the organization indicated by the organization ID. Referring to FIG. 9, the names of the applications are described for convenience, the application ID may be an enumeration of numbers, alphabets, or the like.

A record of which user name is not stored in the user information memory unit 231 is a record (hereinafter, referred to as an "organization record") corresponding to the organization (the user environment E1). A record of which user name is stored is a record (hereinafter, referred to as a "member record") corresponding to the member user. Among the member records, a record of which role is the administrator is hereinafter referred to as an "administrator record", and a record of which role is the user is hereinafter referred to as a "user record". Within the embodiment, the storage account information and the purchased application are items effective in the organization record. However, the storage account information may be effective in the member record. For example, the storage account information may be set to the administrator record, or the storage account information may be set to each user record.

In step S101, one organization record and one administrator record are generated. An organization ID is registered in the organization record. Said differently, the organization ID is allocated to the organization record when the organization record is generated. The organization ID, the user name, the password, the role, and so on are registered in the administrator record. In the organization ID of the administrator record, the same value as the organization ID of the generated organization record is registered. A user name or a password included in the request for the organization registration is registered in the user name and the password. The "administrator" is registered in the role.

The other items of the organization record and the administrator record, the user record, and so on are registered or generated in the process described later.

Subsequently, the setup registration unit 221 sends an e-mail (hereinafter, referred to as a registration reporting mail) reporting, for example, that the organization registration is normally completed to a mail address include in the request for the organization registration. For example, the allocated organization ID is included in the registration reporting mail. However, the normal completion of the organization registration may be included in an HTTP response for an HTTP request including, for example, the request for the organization registration. Further, the organization ID may be designated on a screen 570 for a subscription for a new account by the user.

When the organization registration is normally completed, the administrator inputs the registered ID, the user name, and the password into a login information input area 562 of a portal screen 560, and pushes a login button 563. In response to the push of the login button 563, the administrator terminal 30 sends a login request to the service providing apparatus 20. The organization ID, the user name, and the passwords which are input in the login information input area 562 are included in the login request.

The authentication processing unit 223 of the service providing apparatus 20 authenticates the user who requires the login request based on whether a record, which has the login ID, the user name, and the password included in the login request and a value of which role is the "administrator", is stored in the user information memory unit 231 in response to the login request. In a case where the proper record is stored, the authentication is successful (step S104). In a case where the proper record is not stored, the authentication fails. In the case where the authentication is successful, the setup registration unit 221 returns a Web page displaying a portal screen (hereinafter, an "administrator portal screen 530") exclusively used for the administrator having the user name included in the login request. Hereinafter, the administrator who has logged in is referred to as a "login administrator".

The administrator terminal 30 causes the administrator portal screen 530 to be displayed based on the returned Web page. As illustrated FIG. 8, the administrator portal screen 530 includes a collaboration button 531, a market place button 532, a profile setup button 533, an apparatus registration area 534, a user registration area 535, and so on.

The administrator inputs a file name of a file (hereinafter, an "apparatus information file"), in which information (hereinafter, "apparatus information") related to the apparatuses collaborating with the ScanToStorage service is input, in a text box 534*t* of the apparatus registration area 534, and a registration button 534*b* is pushed.

The apparatus information related to one apparatus 10 includes, for example, a machine number, a machine name, a machine type, a location, and so on. Values of these items are described in the apparatus information file in a format illustrated in, for example, FIG. 10.

FIG. 10 illustrates an exemplary description of the apparatus information in the apparatus information file. Referring to FIG. 10, the apparatus information is described in a Comma Separated Values (CSV) format where values of items are separated by commas, as an example. However, the description format of the apparatus information in the apparatus information file is not limited to the CSV format. The description format may be an eXtensible Markup Language (XML) format or another format.

The machine number is identification information of a machine (an individual piece) of the apparatus 10. For example, a manufacturing number or a serial number may be used as a machine number. The machine name has the same meaning as a machine number. The machine type is information simply indicating the function of a model concerning the model name. The location indicates a place where the apparatus is installed in the user environment E1.

When the file name of the apparatus information file is input in the text box 534*t* and the registration button 534*b* is pushed, the administrator terminal 30 sends a registration request including the apparatus information described in the apparatus information file to the service providing apparatus 20 (step S105).

The setup registration unit 221 of the service providing apparatus 20 registers the apparatus information included in the apparatus registration request in association with the organization ID related to the login administrator when a request for an apparatus registration is received (step S106).

FIG. 11 illustrates an exemplary structure of the apparatus information memory unit. Referring to FIG. 11, the apparatus information memory unit 232 stores a record for each apparatus 10. Each record includes items such as the organization ID, the machine number, the machine name, the machine type, the location, and so on. The apparatus information memory unit 232 maintains the association between the apparatuses 10 and the organization 10.

Subsequently, the administrator push the market place button 532 of the administrator portal screen 530 (FIG. 8) in order to purchase the scanning apparatus application 125 which is an apparatus application required to be installed in the apparatus 10 to enjoy the ScanToStorage service. In response to the push of the market place button 532, the market place screen 540 is displayed on the administrator terminal 30.

As illustrated in FIG. 8, the market place screen 540 includes a button for each application stored in the apparatus application memory unit 233. FIG. 8 illustrates an example of including the buttons 541, 542, and 543 corresponding to three apparatus applications. The button 541 is a button corresponding to the scanning apparatus application 125.

Here, the scanning apparatus application 125 is an object of the purchase, the button 541 is pushed by the administrator. In response to the push of the button 541, the administrator terminal 30 sends an application purchase request including the application ID of the scanning apparatus application 125 to the service providing apparatus 20 (step S107).

When the setup registration unit 221 of the service providing apparatus 20 receives a request for an application purchase, the setup registration unit 221 stores an application ID included in the request into the item of the purchased application included in the user information memory unit 231 as the organization record corresponding to the organization ID corresponding to the login administrator (step S108). For example, referring to FIG. 9, the "scanning apparatus application" in the item of the purchased application of the organization application corresponding to the organization ID equal to 123 is registered at this timing.

Subsequently, the apparatus communication unit 222 acquires the scanning apparatus application 125 corresponding to the application ID included in the request for the application purchase from the apparatus application memory unit 233 and delivers the acquired scanning apparatus application 125 to the apparatus 10 belonging to the login administrator of the source of the request for the application purchase (step S109). The apparatus 10 belonging to the organization ID is the apparatus 10 corresponding to the organization ID information memory unit 232.

Ordinarily, because a firewall is installed in the user environment E1, it is impossible to send the scanning apparatus application 125 from the service providing apparatus 20 to the apparatuses 10 inside the user environment E1. Therefore, the scanning apparatus application 125 may be returned in response to a polling from the communication unit 123 of the apparatus 10.

Said differently, the IP address of the service providing apparatus 20, a port number for the apparatus communication unit 222, or the like is set to the apparatus 10 to collaborate with the service providing apparatus 20. The communication unit 123 of each apparatus 10 performs polling to periodically inquire of the IP address and the port number about whether any event occurs, for example. This inquiry includes, for example, a machine number. The apparatus communication unit 222 of the service providing apparatus 20 returns the scanning apparatus application 125 if the machine number designated in the inquiry is the machine number associated with the organization ID of the purchase source of the scanning apparatus application 125.

However, in a case where no firewall exists between the user environment E1 and the service providing apparatus 20, the apparatus communication unit 222 may send the scanning apparatus application 125 to each apparatus 10. In this case the IP address, the port number, or the like of the apparatus 10 may be included in the apparatus information memory unit 232.

Each apparatus 10 receiving the scanning apparatus application 125 arranges (installs) the scanning apparatus application 125 on the inside of the apparatus 10 (step S110).

Subsequently, when a return button on the market place screen 540 is pushed by the administrator, the market place screen 540 is not displayed and the administrator portal screen 530 is displayed on the administrator terminal 30.

Instead of steps S103 to S110, the following operation and process may be performed.

For example, the scanning apparatus application 125 is asynchronously purchased with the procedure illustrate in FIG. 7 and installed in the apparatus 10. The scanning apparatus application 125 may be purchased using a predetermined Web site or the like.

When the scanning apparatus application 125 is started up at a time of starting up the apparatus 10 which is the install destination of the scanning apparatus application 125, the scanning apparatus application 125 automatically sends a registration request (hereinafter, an "automatic registration request") in which the organization ID, the user name and the password of the administrator, the apparatus information of the apparatus 10, and the application ID or the like of the scanning apparatus application 125, and so on are designated to the service providing apparatus 20. Meanwhile, the organization ID, the user name of the administrator, and the password are input in the administrator terminal 30 and set to the apparatus 10 through the network. When the setup registration unit 221 of the service providing apparatus 20 receives an automatic registration request, the setup registration unit 221 authenticates the organization ID designated in the automatic registration request, the user name of the administrator, and the password. The authentication process may be similar to the process described in step S103. When the authentication is successful, the setup registration unit 221 registers the organization ID designated in the automatic registration request and the apparatus information in the apparatus information memory unit 232 by associating these. Further, the setup registration unit 221 stores the application ID designated in the automatic registration require into the item of the purchased application of the user information memory unit 231 while associating the application ID with the organization ID designated in the automatic registration request. With this procedure, the organization ID and the apparatus information are associated, and the organization ID and the application ID are associated.

Further, the automatic registration request may also work as the request for the organization registration illustrated in step S101. Said differently, an organization record, an administration record, or the like may be stored in the user information memory unit 231 in response to the automatic registration request.

Subsequently, in the ScanToStorage service, the administrator pushes the collaboration button 531 of the administrator portal screen 530 in order to register the account information for the online storage system 40, with which the service providing apparatus 20 directly collaborates. In response to the push of the collaboration button 531, the administrator terminal 30 displays a storage collaboration screen 610 in response to the push of the collaboration button 531. The expression of "directly collaborates" means "without intervening the intermediation apparatus 50".

Figure 12:
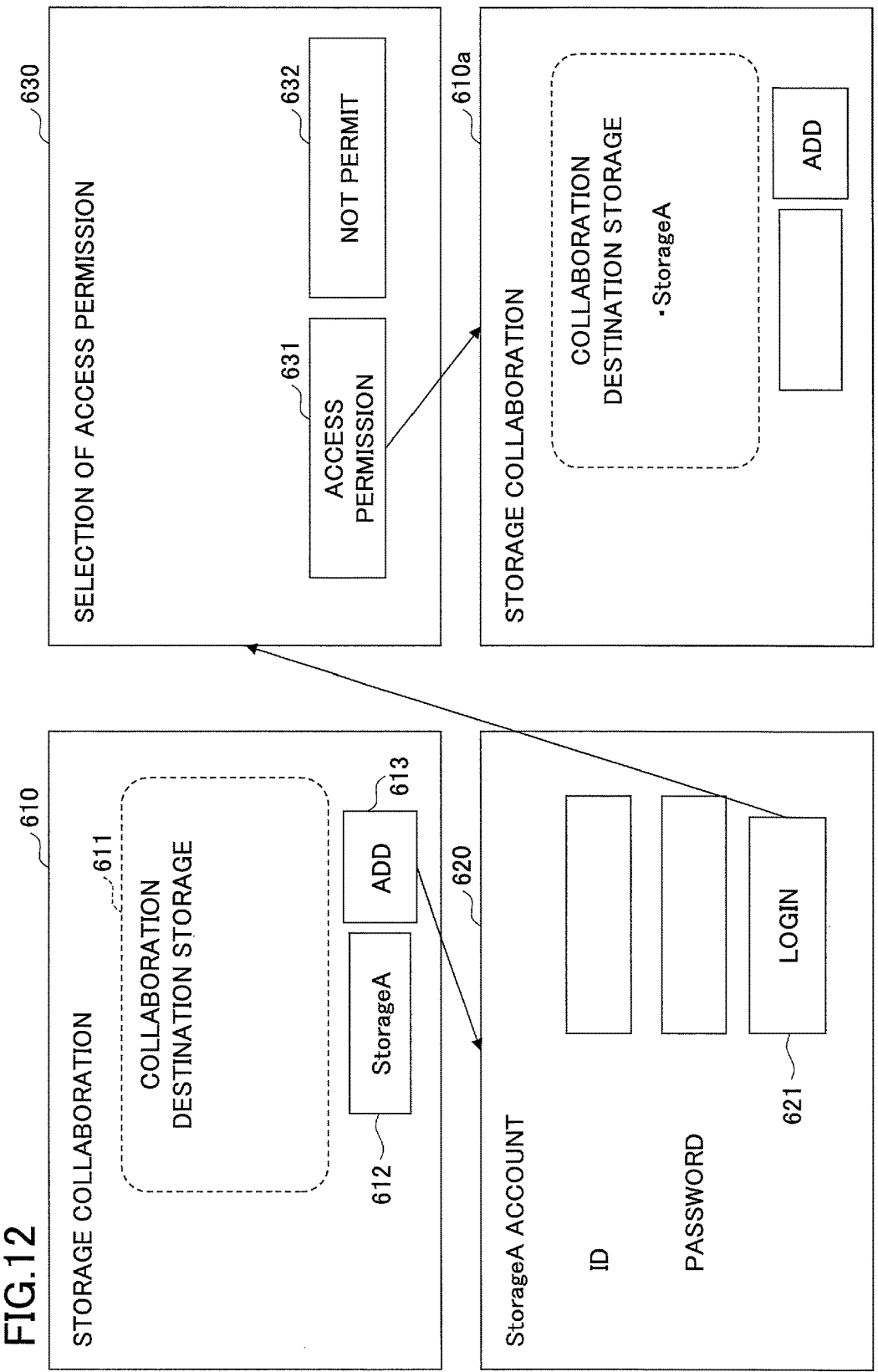
FIG. 12 illustrates an exemplary screen transition for causing account information of an online storage system of a collaboration destination to be registered.

FIG. 12 illustrates an exemplary screen transition for causing the account information of the online storage system of the collaboration destination to be registered.

Referring to FIG. 12, the storage collaboration screen 610 includes a collaboration destination storage display area 611, a collaboration destination input area 612, an addition button 63, and so on. A collaboration destination storage display area 611 displays a name (hereinafter, a "storage name") of online storage system 40 selected as the collaboration destination. If the online storage system 40 selected as the collaboration destination already exists, the storage name of the online storage system 40 is displayed. A collaboration destination input area 612 is provided to input a storage name of the online storage system (hereinafter, referred to as a "collaboration destination storage") which is a direct collaboration destination for the service providing apparatus 20.

When the storage name ("StorageA") is input in the collaboration destination input area 612 and the addition button 613 is pushed, the account input screen 620 is displayed on the administrator terminal 30. The administrator terminal 30 receives an input of the account information (ID (e.g., a mail address) and a password) for the collaboration destination storage from the administrator through the account input screen 620. The account information is previously made by a user registration or the like for the collaboration destination storage. When the ID and the password are input in the account input screen 620 and the login button is pushed, the administrator terminal 30 logs in the collaboration destination storage ("StorageA") based on the ID and the password. The Uniform Resource Locator (URL) of a destination of requesting the login to the collaboration destination storage may be previously stored in the administrator terminal 30 in association with the storage name, or the URL may be input on the collaboration destination input area 612.

If the login is successful, the administrator terminal 30 displays a screen 630 for a selection of access permission. The screen 630 for the selection of access permission is provided to select whether an access of the service providing apparatus 20 to the collaboration destination storage is permitted. If a button 632 ("not permit") is pushed, the display screen on the administrator terminal 30 transits to the administrator portal screen 530. If a button 631 ("access permission") is pushed, the administrator terminal 30 sends a request for account registration for the collaboration destination storage to the service providing apparatus 20 (step S111). The request for the account registration includes the storage name input in the storage collaboration screen 610 and the account information (the ID and the password) input in the account input screen 620.

When the request for account registration is received by the setup registration unit 221 of the service providing apparatus 20, the setup registration unit 221 registers the storage name, the ID, and the password included in the request into the storage account information of the organization record corresponding to the organization ID corresponding to the login administrated (step S112), which storage account information is stored in the user information memory unit 231 (FIG. 9). FIG. 9 illustrates an example where the storage name of Storage A and the ID and the password for StorageA are registered in the organization record whose the organization ID is "123".

The collaboration destination storage and the account information for the collaboration destination storage may be set for each user. In this case, an area to which one or more user name can be input may be provided in, for example, the storage collaboration screen 610 or the account input screen 620. The user name input in the area is included in the request for the account registration and sent to the service providing apparatus 20. The setup registration unit 221 of the service providing apparatus 20 registers the storage name, the ID, and the password in the storage account information of the member record corresponding to the user name included in the request for the account registration.

If the registration process in the service providing apparatus 20 corresponding to the account registration service is successful, the administrator terminal 30 displays a storage collaboration screen 610a. The storage name of the collaboration destination storage is displayed on the collaboration destination storage display area 611 of the storage collaboration screen 610a. Subsequently, the account information of another online storage and so on may be registered. Said differently, account information for multiple online storages may be registered to one organization record or one member record.

Subsequently, the administrator registers the member user who is permitted to use the ScanToStorage service in the user environment E1. Specifically, the administrator inputs the file name of a file (hereinafter, a "user information file"), in which information (hereinafter, "user information") of a member user is described in a text box 535t of the user registration area on the administrator portal screen 530 (see FIG. 8), and pushes a registration button 535b.

The user information of one member user is, for example, items such as the user name, the password, the card ID, and so on. Values of these items are described in the user information file in a format illustrated in, for example, FIG. 13.

FIG. 13 illustrates an exemplary description of user information in a user information file. Referring to FIG. 13, the user information is described in a CSV format where values of items are separated by commas. However, the description format of the user information in the user information file is not limited to the CSV format. The description format may be an eXtensible Markup Language (XML) format or another format.

When the file name of the user information file is input in the text box 535t and the registration button 535b is pushed, the administrator terminal 30 sends a user registration request including the user information described in the user information file to the service providing apparatus (step S113).

The setup registration unit 221 of the service providing apparatus 20 associates the user information included in the user registration request with the organization ID corresponding to the login administrator, and registers in the user information memory unit 231 (step S114). Said differently, a new user record is generated for each user information and one user information is registered for each user record. In the example illustrated in FIG. 9, records of which user name is B, C, or D are registered in step S114. The user information of the administrator may be included in the user registration request. In this case, the user information of the administrator is user information of which user name matches the user name of the administrator record. In this case, the contents of the administrator record may be updated by the user information included in the user registration request. Further, the card ID of the administrator may be registered at this timing, for example.

Subsequently, when the ScanToStorage service is used, the administrator performs an editing operation of a profile which is structural information of the operation screen displayed on the operation panel 15 of each apparatus 10 or the like. The profile of this embodiment includes information of the operation screen of the scanning apparatus application 125 and information of a layout of buttons on the screen, read conditions of scanning for each button, a procedure for the scanned image data, and a storage as a storage destination (a delivery destination).

Figure 14:
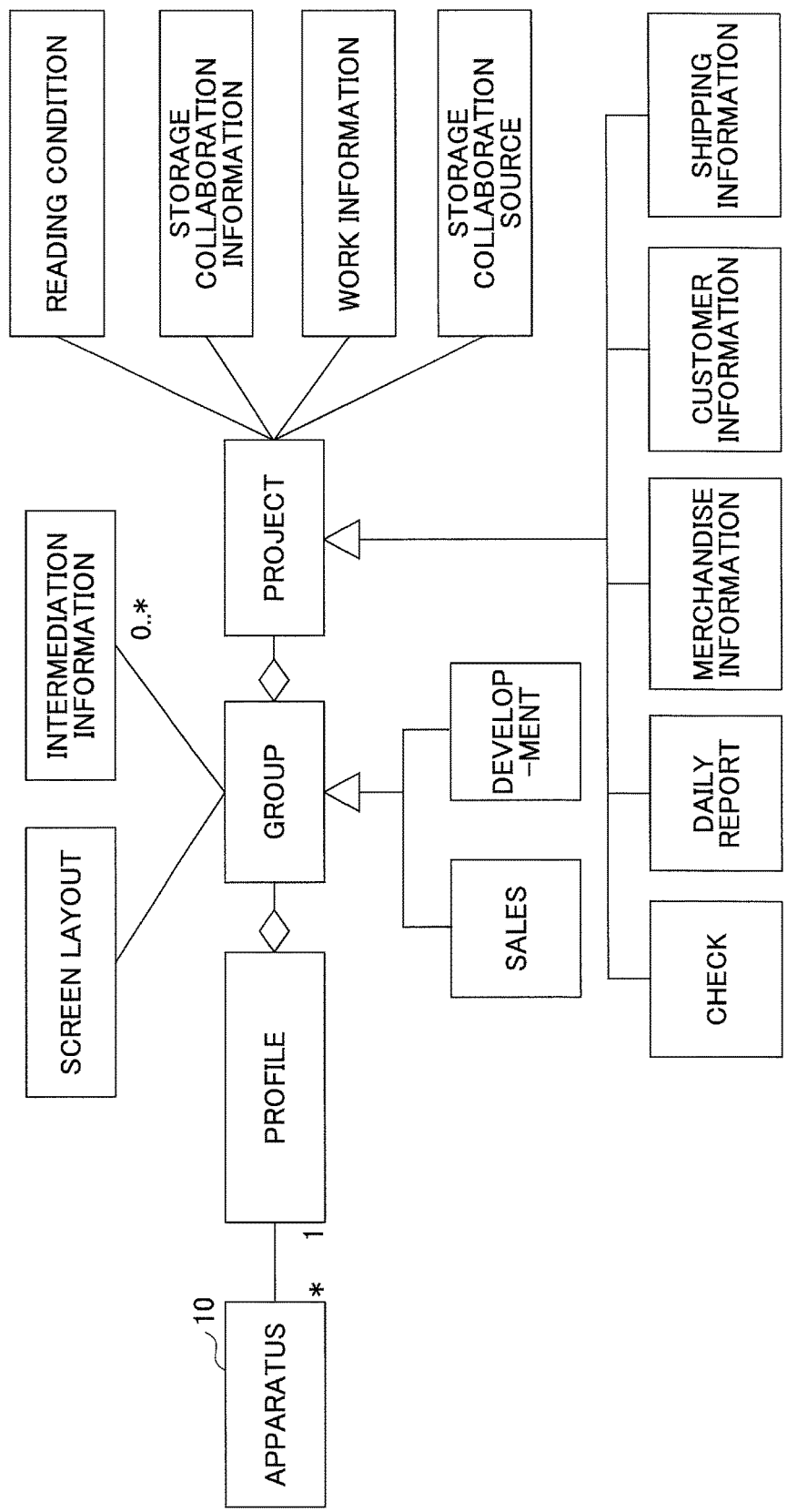
FIG. 14 is a diagram for explaining a conceptual model of a profile.

FIG. 14 is a diagram for explaining a conceptual model of the profile. As illustrated in FIG. 14, each apparatus 10 includes one profile. However, the profiles may be different for different apparatuses 10. For example, different profiles may be set for different users in a single apparatus 10.

The profile includes at least one group. The group is a concept corresponding to, for example, a tab window in the operation screen. Referring to FIG. 14, "sales" and "development" are illustrated as a specific example of the group. These indicate a sales tab window and a development tab window, respectively.

One group includes at least one project, at least one screen layout information, and at least zero intermediation information. The project is a concept corresponding to an operating part such as a button arranged on the tab window. Referring to FIG. 14, specific examples of the project such as "check", "daily report", "merchandise information", "client information", and "shipping information" are illustrated. These illustrate labels of the buttons arranged on the sales tab window.

The screen layout information indicates a layout position, a size, and so on of the operating part (a button) inside a single tab window. However, the screen layout information may be associated with the profile in one-on-one relationship. In this case, the screen layout (the layout of the operating part or the like) corresponding to the groups belonging to the same profile can be used in common.

The intermediation information relates to the intermediation apparatus 50 which can be selected as an intermediation destination for the online storage system 40 in the projects belonging to the group. Specifically, the intermediation information includes the address of the intermediation apparatus 50, the password for accessing the intermediation apparatus 50, and so on.

One project includes reading condition, storage collaboration information, work information, a storage collaboration source, and so on or is associated with these information. The reading condition is a condition of scanning. The storage collaboration information indicates the folder in which online storage system 40 is determined as the storage destination for the scanned image data. The work information relates to a processing (an image processing) performed for the scanned image data before storing the scanned image data. The storage collaboration source is information for identifying an apparatus which is an upload source for uploading the data to the online storage system 40. Specifically, the storage collaboration source is information indicative of the service providing apparatus 20 or information indicative of a specific intermediation apparatus 50.

When the profile setup button 533 is pushed on the administrator portal screen 530 illustrated in FIG. 8, a profile setup screen 550 is displayed on the administrator terminal 30. Referring to FIG. 8, the profile setup screen 550 includes a profile edit button 551 and an apparatus setup button 552. When the profile edit button 551 is selected by the administrated, the administrator terminal 30 displays a profile editing screen 710 on the profile setup screen 550.

Figure 15:
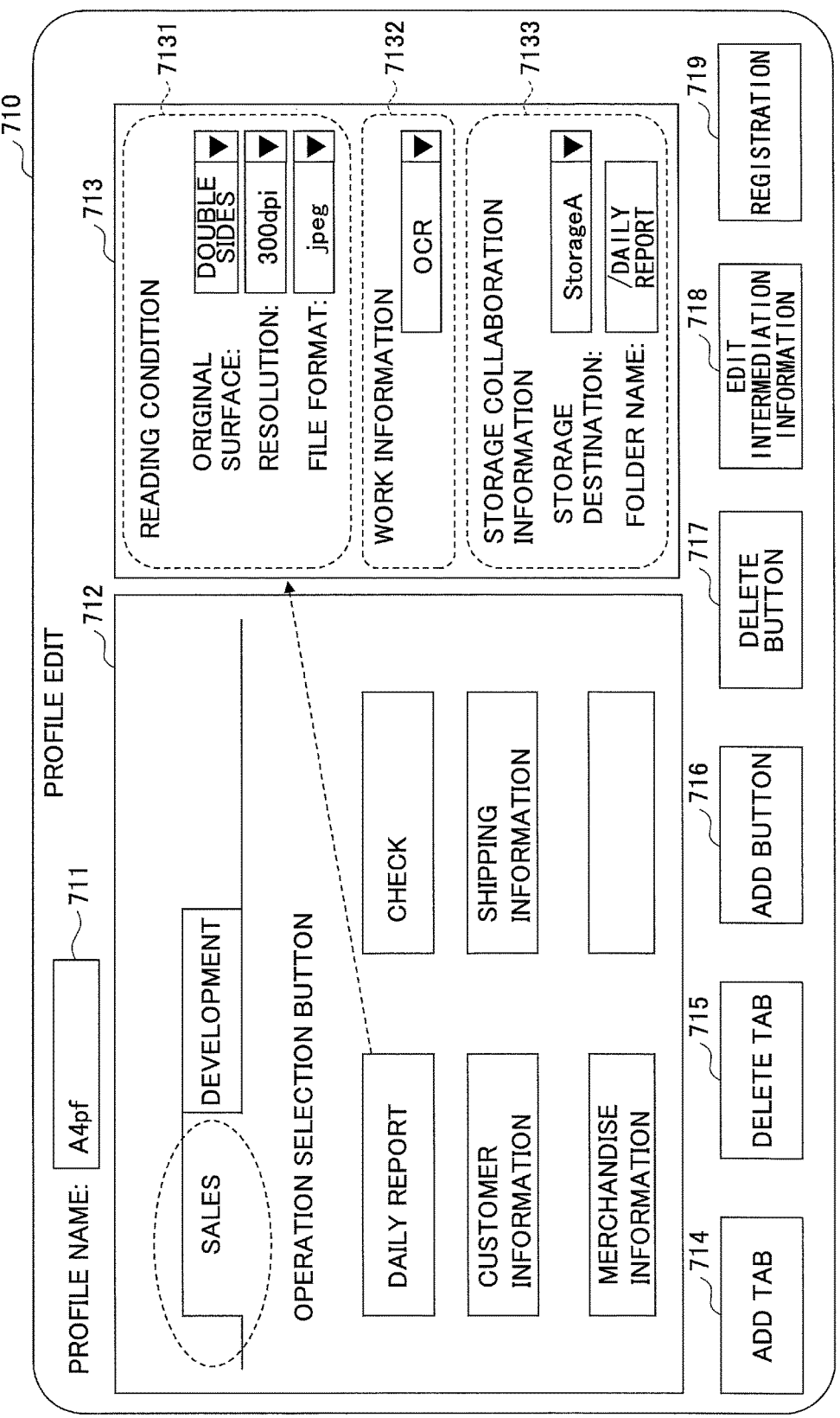
FIG. 15 illustrates an exemplary display of a profile editing screen.

FIG. 15 illustrates an exemplary display of the profile editing screen. Referring to FIG. 15, profile editing screen 710 includes a profile name input area 711, an edit target screen display area 712, a button edit area 713, a tab addition button 714, a tab deletion button 715, a button addition button 716, a button deletion button 717, an intermediation information edit button 718, a registration button 719, and so on.

The profile name input area 711 receives an input of the profile name. The edit target screen display area 712 displays a screen (an operation screen for the scanning apparatus application 125) to be edited. FIG. 15 displays a screen example corresponding the conceptual model illustrated in FIG. 14. Referring to FIG. 15, the sales tab window and the development tab window are included, and a screen including the sales tab window which includes a daily report button, a customer information button, a merchandise information button, a check button, a shipping information button, and so on is to be edited.

The tab addition button 714, the tab deletion button 715, the button addition button 716, and the button deletion button 717 are provided to add a new tab window, delete the tab window to be edited, add a button for the tab window to be edited, and delete the button respectively. An initial state of the edit target screen display area 712 may be a state where one button is arranged on one tab window or a state based on the profile previously produced as a template.

The intermediation information edit button 718 is a button for receiving an addition or a deletion of the intermediation information to or from the group corresponding to the tab window to be edited. For example, when the intermediation information edit button 718 is pushed, the intermediation information setup screen is displayed.

Figure 16:
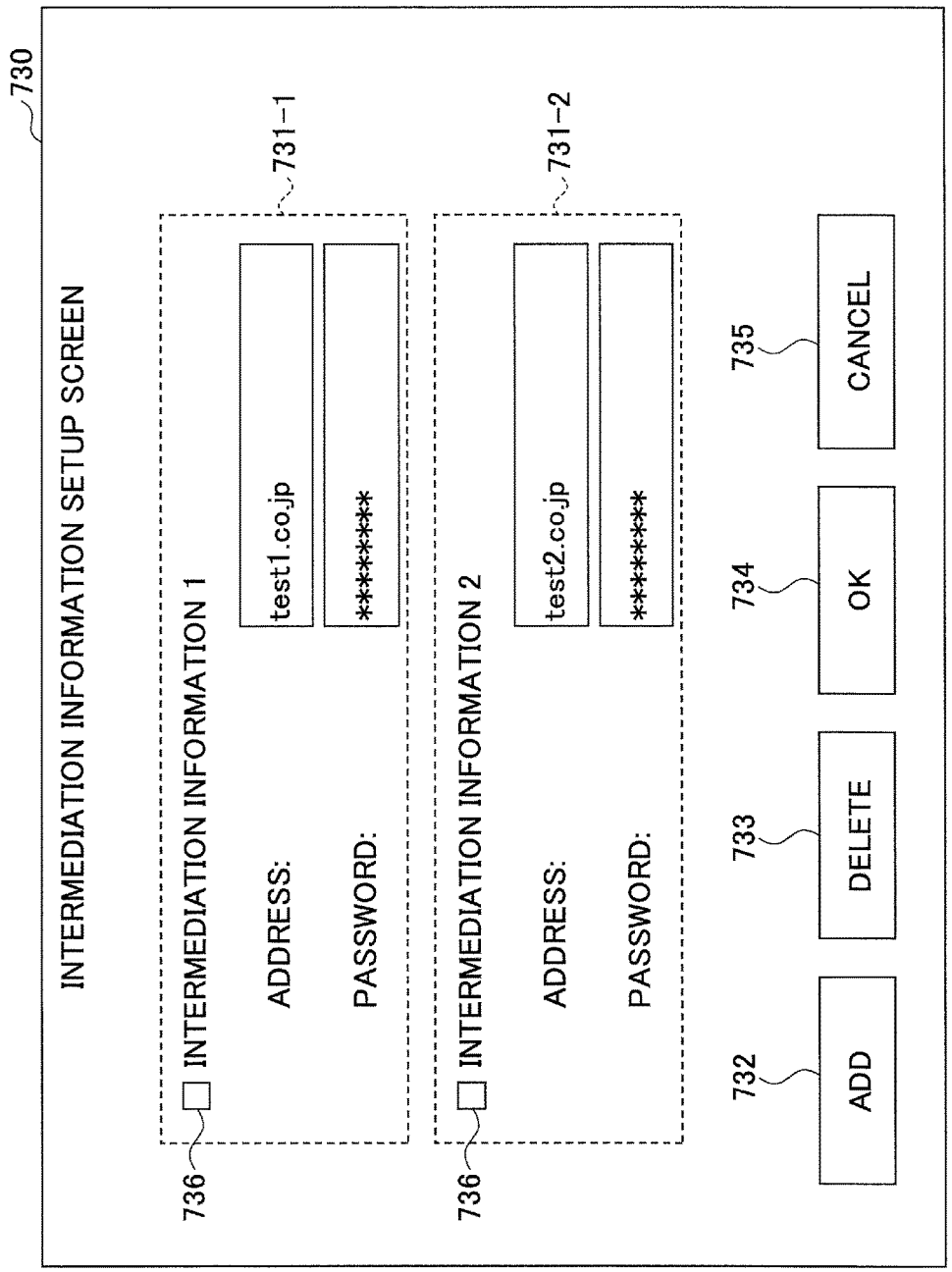
FIG. 16 illustrates an exemplary display of an intermediation information setup screen.

FIG. 16 illustrates an exemplary display of intermediation information setup screen. Referring to FIG. 16, the intermediation information setup screen 730 includes intermediation information setup areas 731-1 and 732-2 (hereinafter, referred to as an "intermediation information 731 without differentiating the intermediation information setup areas 731-1 and 732-2), an addition button 732, a deletion button 733, an OK button 734, a cancellation button 735 and so on.

The intermediation information setup area 731 is provided to set up the address and the password for each intermediation apparatus 50 which can be selected with respect to the project belonging to a group to be edited. The address is information for identifying a specific intermediation apparatus 50 such as the IP address, the host name, or the like of the specific intermediation apparatus. The password is provided to access the specific intermediation apparatus 50. Referring to FIG. 16, two intermediation information setup area 731 are included. Therefore, as to the project belonging to the group to be edited, either one of the two intermediation apparatuses 50 may be selected as an intermediation destination for the online storage system 40.

If the addition button 732 is pushed, the intermediation information setup area 731 is newly added. FIG. 16 illustrates a state where the addition button 732 is twice pushed.

If the deletion button 733 is pushed, the intermediation information setup area 731 of which check button 736 is checked is deleted. If the cancel button 735 is pushed, edited contents in the intermediation information setup screen 730 is cancelled. Then, if the OK button 734 for closing the intermediation information setup screen 730 is closed, the intermediation information setup screen 730 is closed while the edited contents in the intermediation information setup screen 730 is retained. Meanwhile, when the intermediation information setup screen 730 is closed, the profile editing screen 710 is displayed again on the front side.

Meanwhile, at a timing when a focus moves from each intermediation information setup area 731 to another area or at a timing where the OK button 734 is pushed, the administrator terminal 30 may send a connection confirmation request including the address and the password set to the intermediation information setup area 731 to the service providing apparatus 20. The storage collaboration unit 228 of the service providing apparatus 20 may send an authentication request based on the organization ID related to the login administrator and the password contained in the connection confirmation request to an address contained in the connection confirmation request to thereby check whether a connection with the intermediation apparatus 50 is successful. The storage collaboration unit 228 returns a report of whether the connection between the service providing apparatus 20 and the intermediation apparatus 50 is successful to the administrator terminal 30. In a case where this connection fails, the administrator terminal 30 causes a massage indicative of the failure to be displayed and request the user to set up the intermediation information again.

A button (hereinafter, referred to as an "object button") selected on the edit target screen display area 712 of the profile editing screen 710 is an object to be edited by the deletion button 717 or the button edit area 713. The button edit area 713 includes, for example, a reading condition setup area 7131, a work information setup area 7132, a storage collaboration information setup area 7133, and so on.

The reading condition setup area 7131 receives a setup of the reading conditions related to a scan performed in a case where a corresponding button is pushed. Referring to FIG. 15, double sides, a resolution, and a file format are illustrated as an example of setup items. However, another item such as a color mode may be set up.

The work information setup area 7132 is provided to receive a setup of processing performed for the image data scanned in response to a push of the corresponding button. Referring to FIG. 15, an example where an Optical Character Recognition (OCR) is set is illustrated. In this case, the result of OCR is an object to be stored. Instead of the OCR, a translation of the result of the OCR or a conversion of the data format of image data may be set as the processing. Further, a setup of combinations of multiple processing may be enabled.

The storage collaboration information setup area 7133 is provided to receive a setup related to a storage destination of data obtained by scanning and provided with the processing when necessary. Referring to FIG. 15, an example where the storage name of the online storage as the storage destination and the folder name in the online storage can be set is illustrated. The storage name selectable as the storage destination is the storage name registered in the storage account information of the organization record (FIG. 9) corresponding to the organization ID related to the organization ID related to the login administrator, and the storage name of the online storage system 40 of the collaboration destination of the intermediation apparatus 50 related to each intermediation information set for the group to be edited.

Figure 17:
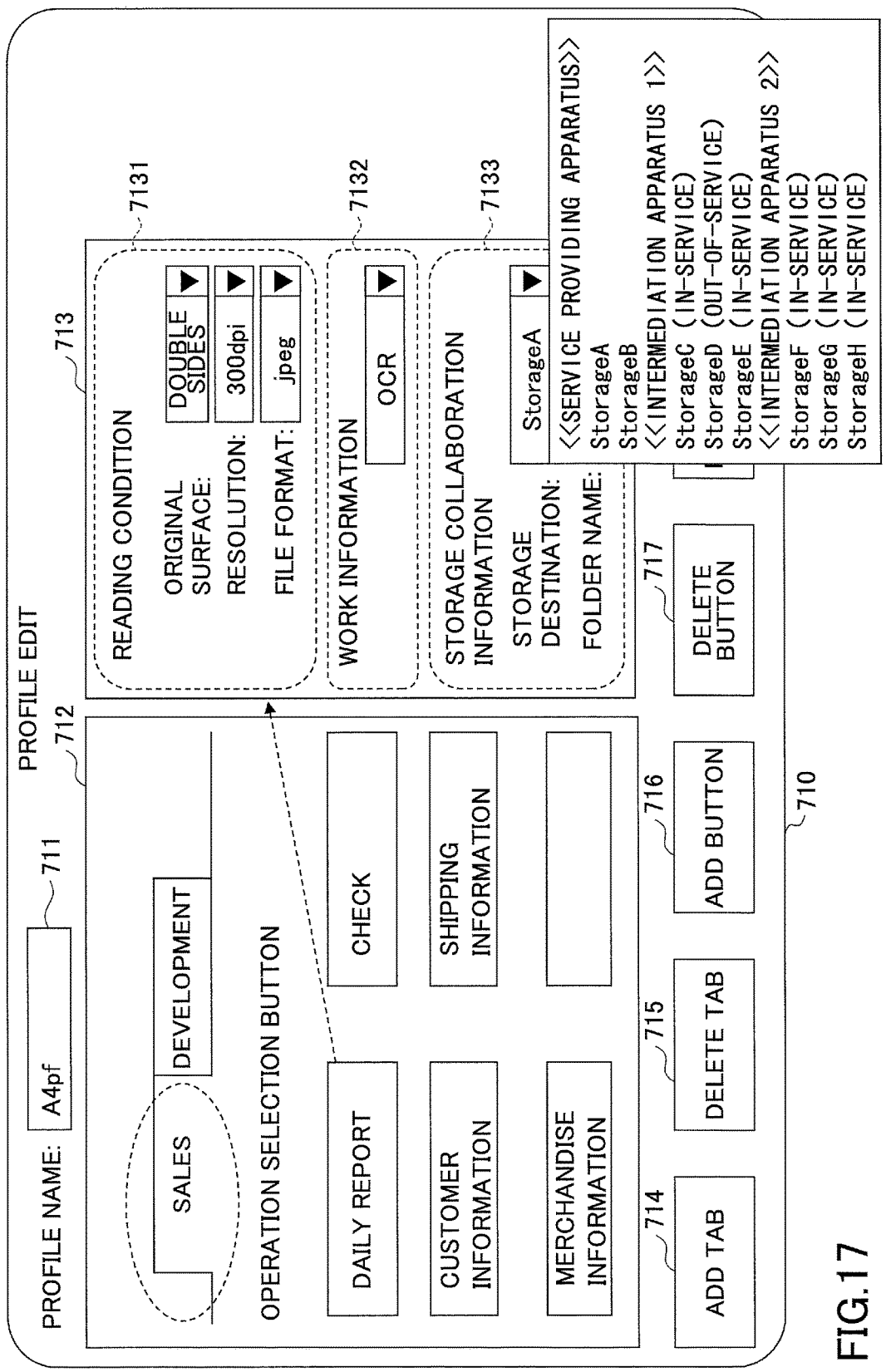
FIG. 17 illustrates an exemplary display of an option of a storage destination forming storage collaboration information.

FIG. 17 illustrates an exemplary display of an option of the storage destination forming the storage collaboration information. Referring to FIG. 17, a list of the storage names of the selectable online storage system 40 is indicated in a view displayed by spreading the list box of the storage destination. In the list, the storage names displayed below <<SERVICE PROVIDING APPARATUS>> are registered in the storage account information of the organization record (FIG. 9) corresponding to the organization ID related to the login administrator. Said differently, the storage name is the name of the online storage system 40 with which the service providing apparatus 20 directly collaborates. Meanwhile, the storage names displayed below <<INTERMEDIATION APPARATUS 1>> or <<INTERMEDIATION APPARATUS 2>> are the names of the online storage system 40 of the collaboration destination of each intermediation information set in the intermediation information setup screen 730. The storage name is displayed in a format of "the storage name (the status)". The indication of "(the status)" is that of the online storage system 40 corresponding to "the storage name". The storage name and the status of the online storage system 40 of the collaboration destination of the intermediation apparatus 50 can be obtained by inquiring each intermediation apparatus 50 through the setup registration unit 221 of the service providing apparatus 20, for example, at a time of spreading the list box. This point is described in detail in FIG. 21.

Further, referring to FIG. 15, the folder name becomes a button name (a label) of the corresponding button in the storage collaboration information setup area. Said differently, if the folder name is changed, the button name of the corresponding button is changed. However, it is unnecessary that the button name matches the folder name.

If a necessary edit is completed in the profile editing screen 710 and the registration button 719 is pushed, the administrator terminal 30 send a request for profile registration including information indicative of setup contents on the profile editing screen 710, the intermediation information setup screen 730, and so on to the service providing apparatus 20 (step S115). The setup registration unit 221 of the service providing apparatus 20 sends a request for checking a connection for the intermediation apparatus 50 related to an address of each intermediation apparatus 50, which address is included in the setup contents for the intermediation information setup screen 730 among the information included in the request for profile registration 8 step S116). The intermediation apparatus 50 returns a sever certificate of the intermediation apparatus 50 in response to the request for checking the connection (step S117). Steps S116 and S117 are performed for each address set for the intermediation information setup screen 730.

Subsequently, the setup registration unit 221 registers the information contained in the registration request in step S115 into the profile memory unit 234 while associating the information with the organization ID of the login administrator (step S118). At this time, as to the intermediation information, the intermediation information of the intermediation apparatus 50, from which the authenticated server certificate is returned, is registered into the profile memory unit 234 as effective intermediation information.

FIG. 18 illustrates a structural example of the profile memory unit. The profile memory unit 234 includes items such as the organization ID, the profile name, the group, and the project for each profile.

The organization ID is an ID of the organization to which the profile belongs. The profile name is a name of the profile. The group is included in the profile. In the records for one profile, records (hereinafter, referred to as a "group record") for each group are formed. The project is included in the group. Inside one group record, the records (hereinafter, referred to as a "project record") for each project are formed.

One group record includes a group name, layout information, intermediation information, and at least one project record. The group name is an identification name of the group and a label displayed on a tab of a tab window corresponding to the group. The layout information is information of arranging the buttons in the tab window corresponding to the group. In a case where the screen layout information is associated with the profile in one-on-one relationship in the conceptual model of the profile illustrated in FIG. 14, the layout information is, for example, an item arranged on a side of the profile name and may be stored in items belonging to the same profile and bridging multiple group records (said differently, outside the group records) in FIG. 18.

The intermediation information is an item storing setup contents in the intermediation information setup screen 730. The intermediation information illustrated in FIG. 18 corresponds to the setup contents in FIG. 16. Therefore, the addresses and the passwords of the two intermediation apparatus 50 are stored.

One project record includes items of the project name, the reading condition, the work information, the storage collaboration information, the storage collaboration source, and so on. The project name is an identification name of the project and also is a label of the button. Within the embodiment, the project name matches the folder name of the storage collaboration information. The other items are as described in the profile editing screen 710 (see FIG. 15). In the storage collaboration source, the "service providing apparatus" is registered in the project where the storage name belonging to <<SERVICE PROVIDING APPARATUS>> is selected in a list box of the storage collaboration information setup area 7133 of the profile editing screen 710 (FIG. 15). On the other hand, the "intermediation apparatus N" is registered in the project where the storage name belonging to <<INTERMEDIATION APPARATUS N>> (N is "1" or "2" in FIG. 15) is selected in the list box. The identification information of the "service providing apparatus" and the identification information of the "intermediation apparatus N" are expressed by such a character string N.

Subsequently, if the apparatus setup button 551 of the profile setup screen 550 (FIG. 8) is pushed by the administrated, the administrator terminal 30 displays the profile apparatus setup screen 720.

Figure 19:
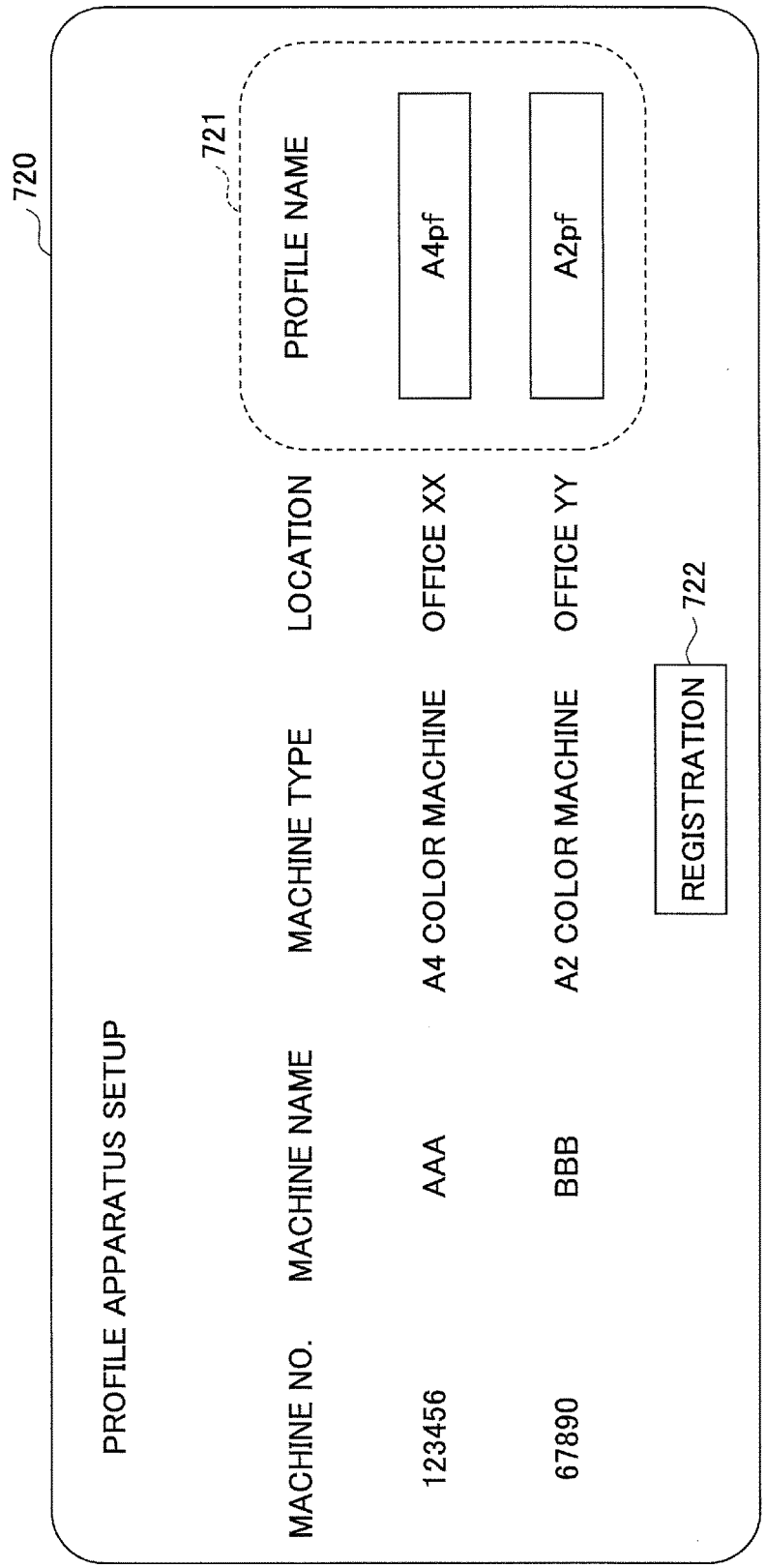
FIG. 19 is an exemplary display of a profile apparatus setup screen.

FIG. 19 illustrates an exemplary display of the profile apparatus setup screen. The profile apparatus setup screen 720 is provided to set up a correspondence between the profile and the apparatus 10. Referring to FIG. 19, the apparatus information and the profile name input area 721 are displayed on the profile apparatus setup screen 720 for each apparatus 10 whose apparatus information is stored in the apparatus information memory unit 232 in association with the organization ID of the login administrator. The administrator inputs the profile name of a profile corresponding to (used by) each apparatus 10 into the profile name input area 721 and pushes a registration button 722.

In response to the push of the registration button 722, the administrator terminal 30 sends a registration request including the setup contents (e.g., a combination of the machine number and the profile name) on the profile apparatus setup screen 720 to the service providing apparatus 20. The setup registration unit 221 of the service providing apparatus 20 registers the information included in the registration request into the profile apparatus correspondence memory unit 235.

FIG. 20 illustrates a structural example of the profile memory unit. The profile apparatus correspondence memory unit 235 stores the machine number, the profile name, and the application ID of the apparatus application while associating the machine number, the profile name, and the application ID. The associated application ID is an application ID of the apparatus selected on the market place screen 540 (FIG. 8). Said differently, the setup registration unit 221 stores the application ID of the apparatus application in the memory device 203 or the like in association with the login administrator, and the application ID is stored into the profile apparatus correspondence memory unit 235 in association with the setup contents in response to the registration request for the setup contents in the profile apparatus setup screen 720.

Subsequently, if a logout button 536 on the administrator portal screen 530 (FIG. 8) is pushed (step S119), the administrator terminal 30 sends a logout request to the service providing apparatus 20. In response to the receipt of the logout request, the service providing apparatus 20 releases the state where the login administrator logging in.

Subsequently, described is a process preformed in the storage collaboration information setup area 7133 of the profile editing screen 710 illustrated in FIG. 17 when it is instructed to spread the list box for selecting the storage destination (the upload destination).

Figure 21:
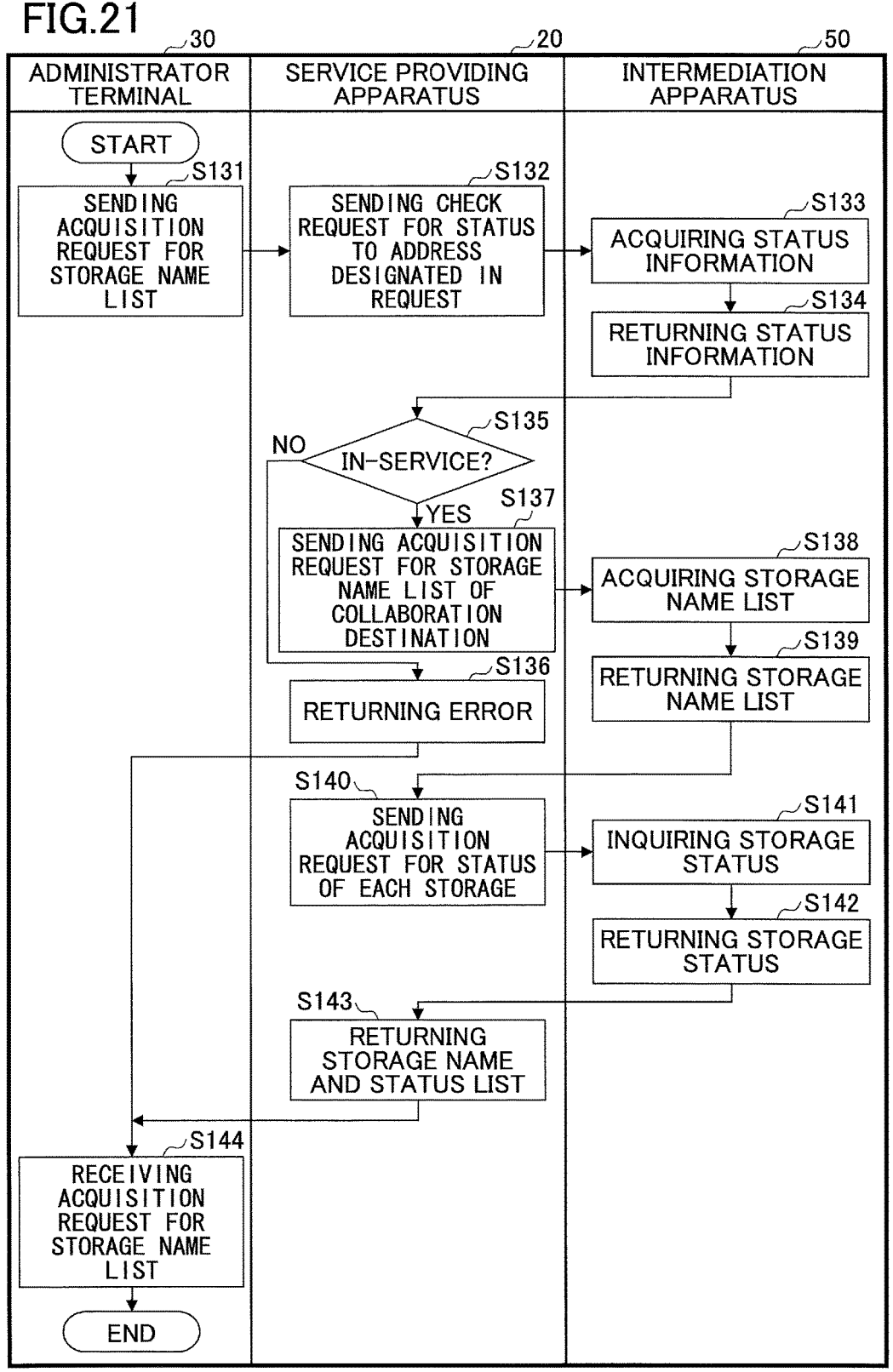
FIG. 21 is a flowchart explaining an exemplary process performed at a time of spreading a list box in which a storage destination of data is selected.

FIG. 21 is a flowchart explaining an exemplary process performed at a time of spreading the list box in which the storage destination of data is selected. FIG. 21 illustrates a process performed for one intermediation apparatus 50 whose address and password are set on the intermediation information setup screen 730. In a case where addresses and passwords of the multiple intermediation apparatuses 50 are set on the intermediation information setup screen 730, the processes illustrated in FIG. 21 are performed for each intermediation apparatus 50. Hereinafter, an intermediation apparatus 50 to be processed is referred to as a "target intermediation apparatus 50".

When it is instructed to spread the list box, the administrator terminal 30 designates the organization ID and the address and the password set to the target intermediation apparatus 50 and sends an acquisition request to acquire the view of storage names of the online storage system 40 of the target intermediation apparatus 50 to the service providing apparatus 20 (step S131).

The setup registration unit 221 of the service providing apparatus 20 sends a check request for a status to the address designated in the acquisition request (step S132). The organization ID and the password received in step S131 are designated in the check request. The sending of the check request corresponds to a call of one interface in the intermediation API 53. Therefore, the check request is received by the collaboration intermediation unit 511 of the target intermediation apparatus 50 corresponding to the address.

The organization ID and the password designated in the check request are used for authentication. In a case where the authentication is successfully completed, step S133 is performed. In step S133, the status administration unit 512 of the target intermediation apparatus 50 acquires status information stored in the status information memory unit 521.

FIGS. 22A and 22B illustrate structural examples of status information. Referring to FIGS. 22A and 22B, the status information includes a status and a scheduled recovery. Within the embodiment, the value of the status is "running" or "updating". The scheduled recovery is effective in a case where the value of the status is "updating" and indicates a time when a recovery from an updating operation is scheduled. The status administration unit 512 updates memory contents of the status information memory unit 521 in response to a change of the status of the intermediation apparatus 50.

Subsequently, the collaboration intermediation unit 511 returns the acquired status information to the setup registration unit 221 (step S134). The setup registration unit 221 determines whether the value of the status information is "running" or not (step S135). In a case where the value of the status information is not "running" (NO of step S135), the setup registration unit 221 returns a response indicative of, for example, an error (step S136).

On the other hand, in a case where the value of the status information is "running" (YES of S135), the setup registration unit 221 sends an acquisition request for the view of the online storage systems 40 of the collaboration destination to the address of the target intermediation apparatus (step S137). The organization ID and the password received in step S131 are designated in the acquisition request. The sending of the acquisition request corresponds to a call of one interface in the intermediation API 53. Therefore, the acquisition request is received by the collaboration intermediation unit 511 of the target intermediation apparatus 50.

The organization ID and the password designated in the acquisition request are used for authentication. In a case where the authentication is successfully completed, step S138 is performed. In step S138, the collaboration intermediation unit 511 acquires the view of the storage names of the online storage system 40 collaborating the target intermediation apparatus 50 from the collaboration information memory unit 522.

FIG. 23 illustrates an exemplary structure of the collaboration information memory unit. Referring to FIG. 23, the collaboration information memory unit 522 stores the storage name in association with the organization ID. Referring to FIG. 23, the online storage systems 40 of the collaboration destination may be different for each organization ID, or the online storage systems of the collaboration destination may be used in common for all organization IDs with respect to one intermediation apparatus 50.

In step S138, a view of the storage names corresponding to the received organization ID is acquired. Subsequently, the collaboration intermediation unit 511 returns the acquired view of the storage names to the setup registration unit 221 (step S139).

Subsequently, the setup registration unit 221 sends an acquisition request for a running status of each online storage system 40 corresponding to the storage names included in the received view to the address of the target intermediation apparatus 50 (step S140). The organization ID and the password received in step S131 and the storage name are designated in the acquisition request. Only one storage name may be designated for only one acquisition request, or multiple storage names may be designated for only one acquisition request. In a case where only one storage name is designated for only one acquisition request, step S140 may be repeated by the number of storage names included in the view of the storage names. The sending of the acquisition request for the status of the online storage system 40 corresponds to a call of one interface in the intermediation API 53. Therefore, the acquisition request is received by the collaboration intermediation unit 511 of the target intermediation apparatus 50 corresponding to the address.

The organization ID and the password designated in the acquisition request are used for authentication. In a case where the authentication is successfully completed, step S142 is performed. In step S142, the collaboration intermediation unit 511 inquires of the online storage system 40 corresponding to the storage name designated in the acquisition request about the running status of the online storage system 40. Subsequently, the collaboration intermediation unit 511 returns information indicative of the running state returned in response to the inquiry to the setup registration unit 221 (step S142).

Subsequently, the setup registration unit 221 returns a response including information, to which a value indicative of the running status of the online storage system 40 corresponding to the storage name for each storage name included in the view returned in step S139 to the administrator terminal (step S143).

The administrator terminal 30 receives the response returned in step S136 or S143 (step S143). Based on the information included in the response returned in step S143, the administrator terminal 30 can display the storage names of the collaboration destination and their statuses in the spread list for each intermediation apparatus 50.

After the above processes, a preparation operation for using the ScanToStorage service is completed by the administrator. Subsequently, described is a procedure performed in the information processing system 1 when the ScanToStorage service is used by a member user.

Figure 24A:
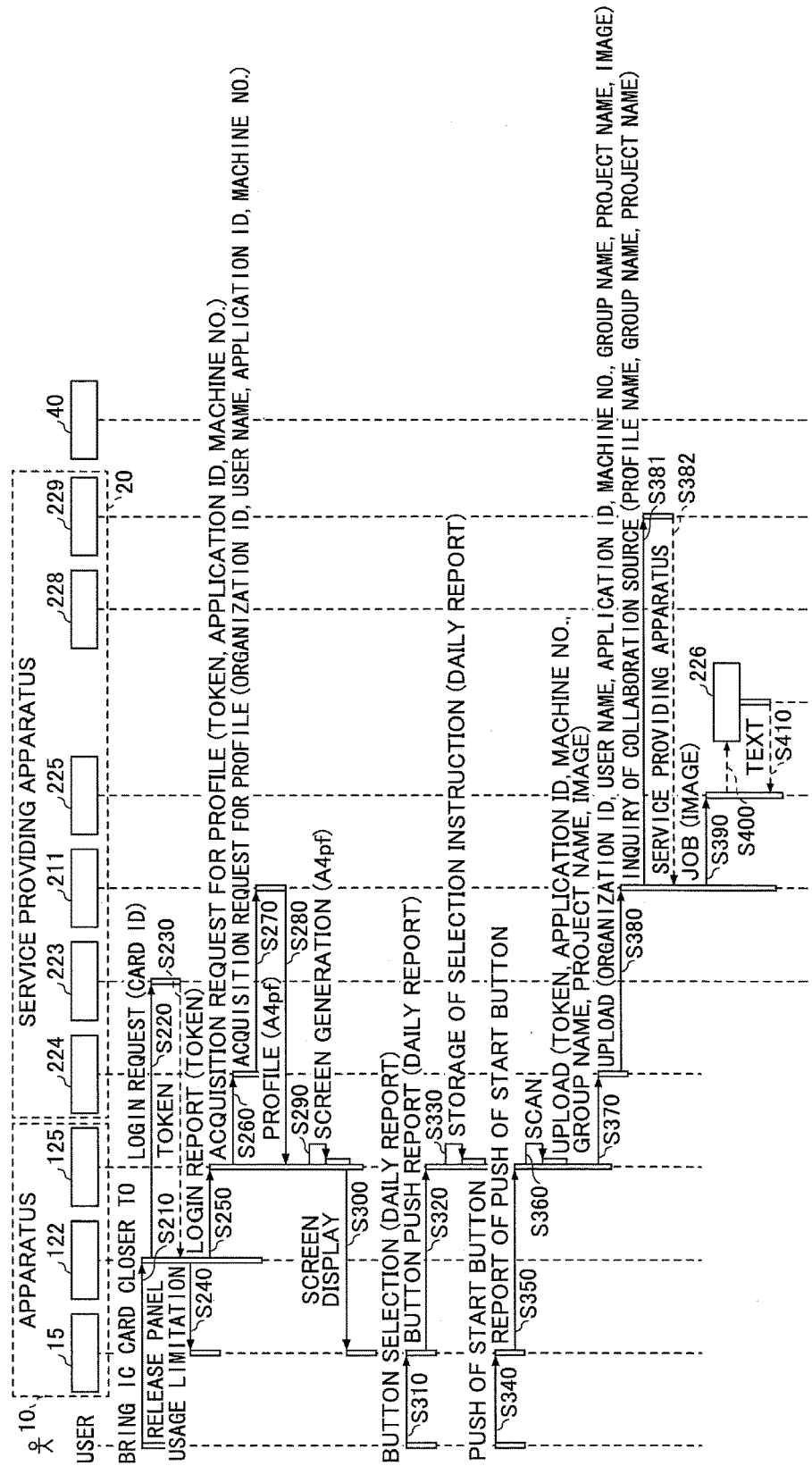
FIGS. 24A and 24B are a sequence chart for explaining a first example of a process at a time of using a ScanToStorage service.
Figure 24B:
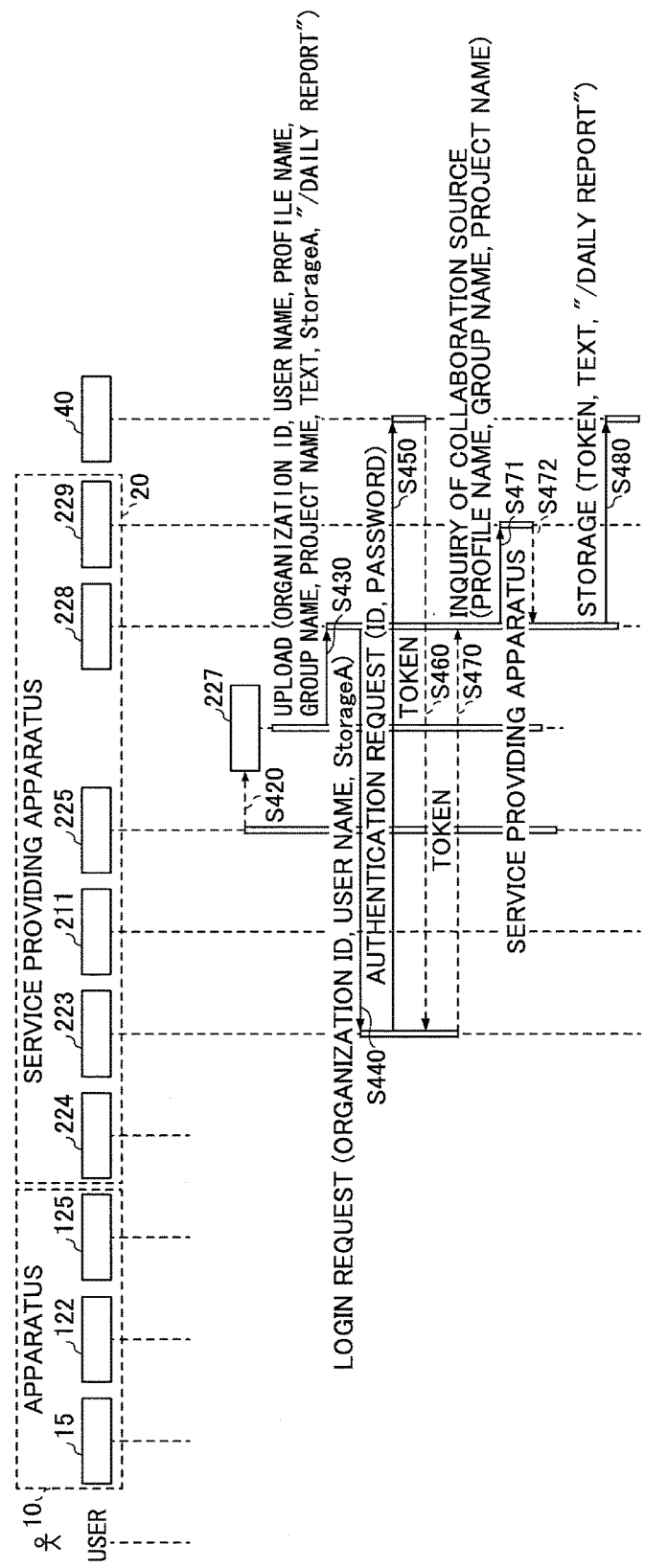

FIGS. 24A and 24B are a sequence chart for explaining a first example of the process at a time of using the ScanToStorage service. Referring to FIGS. 24A and 24B, the apparatus 10 to be operated is simply referred to as the "apparatus 10", and the member user who operates the apparatus 10 is referred to as a "user". At a time of starting the procedure illustrated in FIGS. 24A and 24B, no user logs in the apparatus 10.

When the user brings an IC card closer to a card reader (not illustrated) in order to log in the apparatus 10, the apparatus authentication unit 122 acquires a card ID from the IC card through the card reader (step S210). Subsequently, the apparatus authentication unit 122 sends an authentication request including the card ID to the service providing apparatus 20 (step S220).

The authentication processing unit 223 of the service providing apparatus 20 authenticates using the card ID included in the authentication request in response to a receipt of the authentication request. For example, if the record including the card ID is stored in the user information memory unit 231, the authentication may be determined to be successfully completed. The organization ID and the machine number may be sent along with the card ID from the apparatus 10. In this case, if there is no contradiction in a combination of the organization ID and the machine number may, the authentication may be determined to be successfully completed. In a case where the authentication is successfully completed, the session administration unit 224 opens a session with the apparatus 10. The session administration unit 224 stores the organization ID and the user name, which are associated with the card ID in the user information memory unit 231, into the memory device 203 while associating the organization ID and the user name with the session. The session administration unit 224 generates a token (cookie) which is identification information of the session. The authentication processing unit 223 returns a response, which indicates a success of the authentication and is caused, by the authentication processing unit 223, to include the token, to the apparatus authentication unit 122 of the apparatus 10 (step S230).

The apparatus authentication unit 122 stores the token included in the response upon receipt of the response including the success of the authentication in the RAM 112. The apparatus authentication unit 122 releases a limitation (a lock) to a usage of the operation panel 15 in order to enable the user operation (step S240). By releasing the limitation to the usage, the user can operate the apparatus 1 through the operation panel 15.

Subsequently, the apparatus authentication unit 122 reports the success of the login to each application started inside the apparatus 10. Within the embodiment, the success of the login is reported to the scanning apparatus application 125 (step S250). The token is attached to the report of the success of the login. Therefore, the scanning apparatus application 125 obtains the token through the report.

Subsequently, if the scanning apparatus application 125 is selected as an object to be used by an operation through the operation panel by the user, the scanning apparatus application 125 sends an acquisition request to acquire a profile to the scan server application 211 of the service providing apparatus 20 while designating the own application ID, the token, the machine number of the apparatus 10 (the own machine), and so on (step S260). The session administration unit 224 of the service providing apparatus 20 relays the acquisition request. When the relay is performed, the session administration unit 224 converts a token included in the acquisition request to the organization ID and the user name, which are identified by the token, and transfers the acquisition request to the scan server application 211 (step S270). The session administration unit 224 rejects the acquisition request including an incorrect token.

Subsequently, the scan server application 211 specifies the application ID designated in the acquisition require and the profile name associated with the machine number by referring to the profile apparatus correspondence memory unit 235 (FIG. 20). Further, the scan server application 211 acquires the specified profile name and the profile identified by the organization ID converted from the token from the profile memory unit 234 (FIG. 18), and returns the acquired profile to the scanning apparatus application 123 (step S280).

The scanning apparatus application 125 generates the operation screen based on the returned profile (step S290). Subsequently, the scanning apparatus application 125 displays the operation screen on the operation panel 15 ((step S300). Specifically, the display control unit 124 generates the operation screen based on the profile and displays the operation screen on the operation panel 15.

Figure 25:
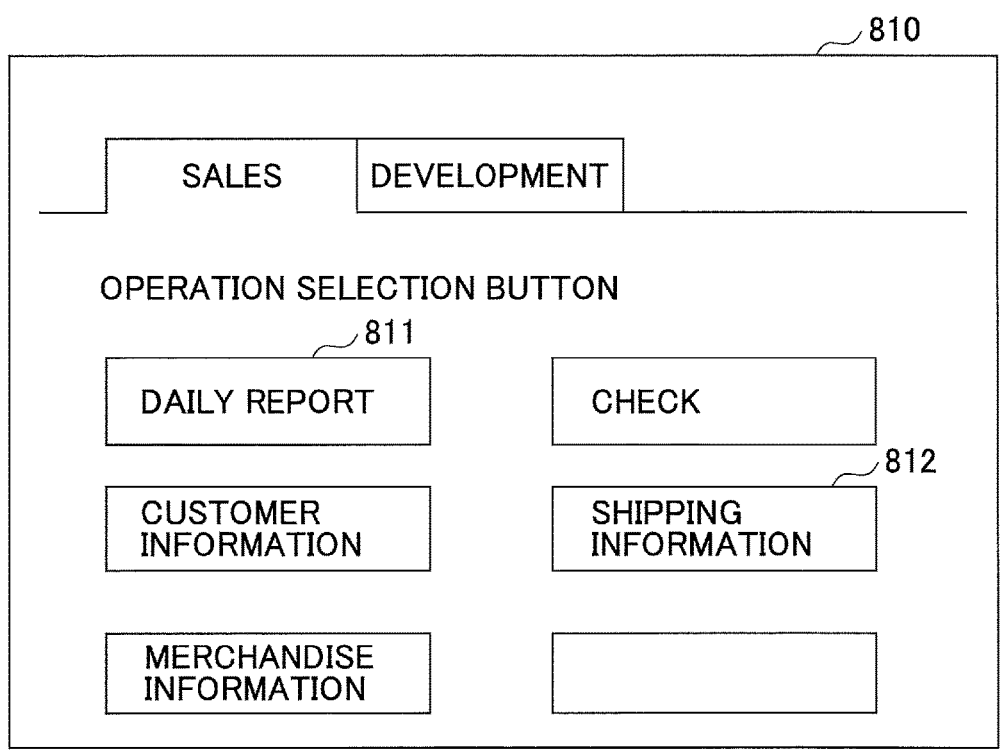
FIG. 25 illustrates a display example of an operation screen of a scanning apparatus application.

FIG. 25 illustrates a display example of the operation screen of the scanning apparatus application. The operation screen 810 illustrated in FIG. 25 is the same as the screen illustrated in the edit target screen display area 712 illustrated in FIG. 15.

Subsequently, a button suitable for a user business is selected from buttons of the operation screen 810 by the user (step S310). For example, in a case where the dairy report is an object of the scan, a button 811 is selected. If the operation panel 15 reports the selection of the button (step S320), the scanning apparatus application 125 stores the group name (hereinafter, a "target group name") corresponding to the selected button 811 ("daily report"), the project name (hereinafter, a "target project name"), and reading conditions into the RAM 112 (step S330). The reading conditions are associated with the target group name and the target project name in the profile used to generate the operation screen 810.

Subsequently, an original (e.g., a daily report) to be scanned is set by the user to the apparatus 10 and a start button on the operation panel 15 is pushed (step S340), the operation panel 15 reports the push of the start button to the scanning apparatus application 125 (step S350). In response to the push of the start button, the scanning apparatus application 125 causes the apparatus 10 to perform the scan job for the original through the apparatus control unit 121 (step S360). Said differently, image data are read from the original by the scanner 12. At this time, the reading conditions used have been stored in the RAM 112 in step S330. Therefore, the original is scanned using the reading conditions suitable for scanning of the daily report, and the image data are generated.

Subsequently, the scanning apparatus application 125 sends (uploads) the image data to the scan server application 211 along with the own application number, the machine number, the target group name, the target project name, and the token (step S370). The session administration unit 224 converts the token to the organization ID and the user name, and transfers a result of the conversion, the application ID, the machine number, the target group name, the target project name, and the image data to the scan server application 211 (step S380).

Subsequently, the scan server application 211 specifies the profile corresponding to the transferred application ID and the machine number based on the profile apparatus correspondence memory unit 235 and the profile memory unit 234, and inquires of the collaboration source determining unit 229 about the storage collaboration source by designating a target group name and the target project name (step S381). The collaboration source determining unit 229 acquires a value of the storage collaboration source corresponding to the target group name and the target project name in a target profile stored in the profile memory unit 234. The collaboration source determining unit 229 returns the acquired value of the storage collaboration source to the scan server application 211 (step S382). Referring to FIGS. 24A and 24B, the value of the storage collaboration source is the "service providing apparatus". The storage collaboration source may be determined when the scan server application 211 refers to the target profile.

Subsequently, the scan server application 211 specifies the work information and the storage collaboration information corresponding to the target group name and the target project name and the storage collaboration information from the target profile.

The scan server application 211 inputs an execution request for a job (hereinafter, referred to as "job A") indicating a process corresponding to the work information and the storage collaboration information to the job processing unit 225 (step S390). Here, the work information indicates an OCR process, and the storage information indicates storage (upload) to a folder of "/daily report" of StorageA.

Further, the job is associated with the organization ID of the apparatus 10, the user name, the target profile name, the target group name, the target project name, and the scanned image data. The execution request is accumulated in a job queue formed in the RAM 112. The job is performed out of synchronization with the execution request for the job. However, the job may be performed in synchronization with the execution request for the job.

Subsequently, after the job processing unit 225 takes out job A from the job queue, the job processing unit 225 requests the OCR process to the OCR processing unit 226 based on the work information corresponding the job A (step S410). The OCR processing unit 226 provides the OCR process to the image data and outputs the text data as the processing result (step S410).

Subsequently, the job processing unit 225 requests the upload processing unit 225 to upload the text data, the storage name and the folder name indicated by the storage collaboration information, the organization ID and the user name related to job A, the profile name related to the job, the group name, and the project name to upload these to the a folder of "/daily report" of StorageA (step S420). The upload processing unit 227 requests the storage collaboration unit 228 to perform the upload (step S430).

The storage collaboration unit 228 requests a login to the online storage system 40 corresponding to the designated storage name to the authentication processing unit 223 (step S440). The storage collaboration unit 228 designates the organization ID designated by the upload request and the storage name into the login request. The authentication processing unit 223 acquires the organization record corresponding to the organization ID from the user information memory unit 231, and acquires account information (the ID and the password) associated with the storage name corresponding to the upload request from the storage account information of the organization record. The authentication processing unit 223 sends an authentication request to, for example, the online storage system 40 (hereinafter, referred to as "StorageA") corresponding to StorageA using the acquired account information (step S450).

When the authentication of the account information designated in the authentication request in Storage A, the StorageA returns a token for accessing Storage A (step S460). The authentication processing unit 223 returns the returned token to the storage collaboration unit 228 (step S470).

Subsequently, the storage collaboration unit 228 inquires of the collaboration source determining unit 229 about the storage collaboration source by designating the profile name, the group name, and the project name designated in step S430 (step S471). The collaboration source determining unit 229 acquires the value of the storage collaboration source corresponding to the group name and the project name in the profile corresponding to the project name stored in the profile memory unit 234. The collaboration source determining unit 229 returns the acquired value to the scan server application 211 (step S472). Referring to FIGS. 24A and 24B, the returned value of the storage collaboration source is the "service providing apparatus". Meanwhile, the result of the determination in step S382 may be retained in association with the job. In this case, the storage collaboration unit 228 may specify the storage collaboration source based on the result of the determination associated with the job instead of performing step S471.

In response to an event where the storage collaboration source is the "service providing apparatus", the storage collaboration unit 228 recognizes that the storage collaboration unit 228 itself is required to perform the upload. Therefore, the storage collaboration unit 228 designates a token acquired in step S470 and sends a storage request of requesting the text data obtained by the OCR process to be stored in the online storage (Storage A) specified by the storage name designated by the upload request by designating the token acquired in step S470 (step S480). At this time, the folder name (/daily report) designated in the upload request is designated as the folder of the storage destination.

As a result, the text data are stored in "/daily report" of Storage A.

Subsequently, an example where data are uploaded through the intermediation apparatus 50 is described.

Figure 26A:
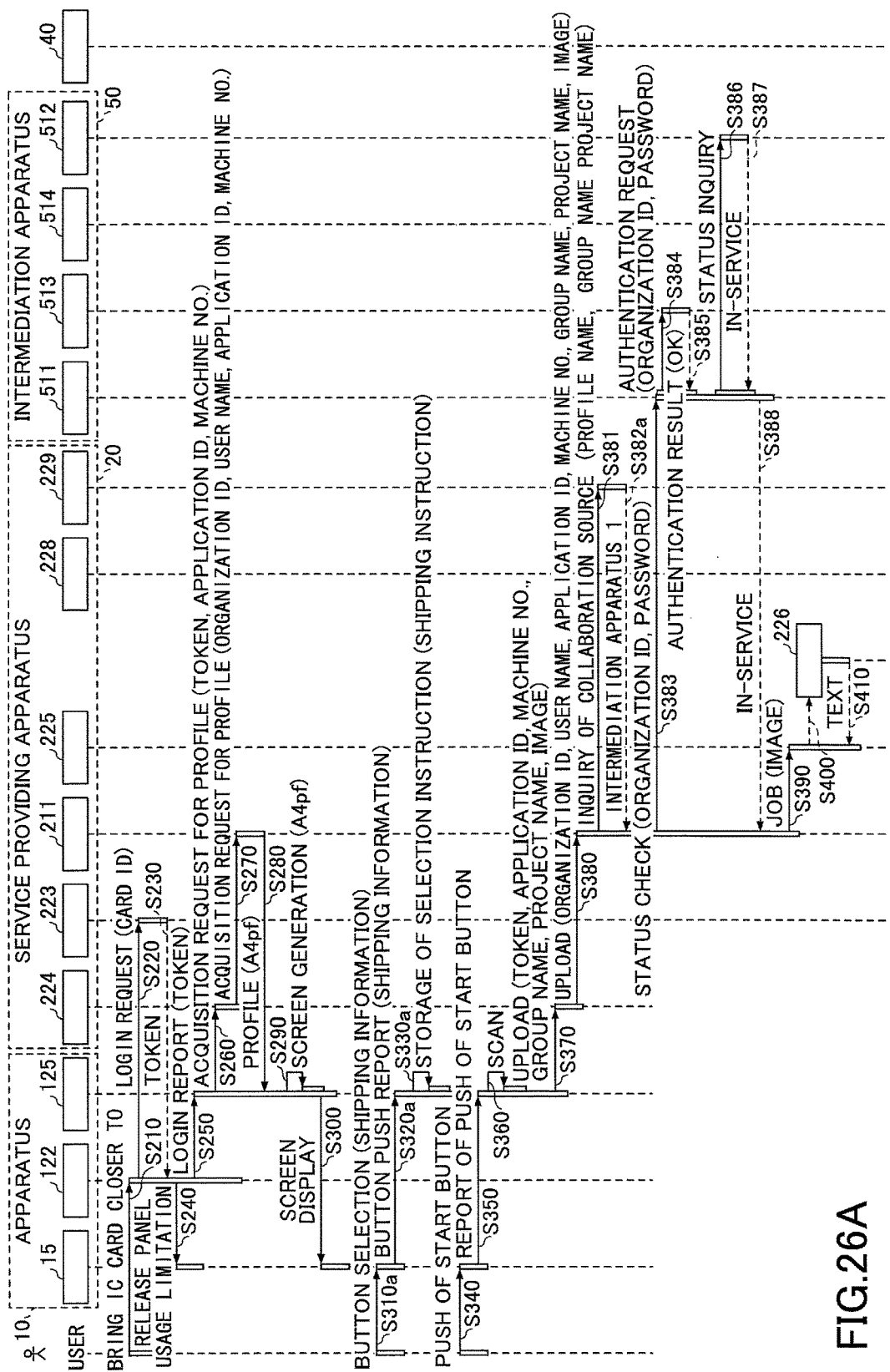
FIGS. 26A and 26B are a sequence chart for explaining a second example of the procedure at the time of using the ScanToStorage service.
Figure 26B:
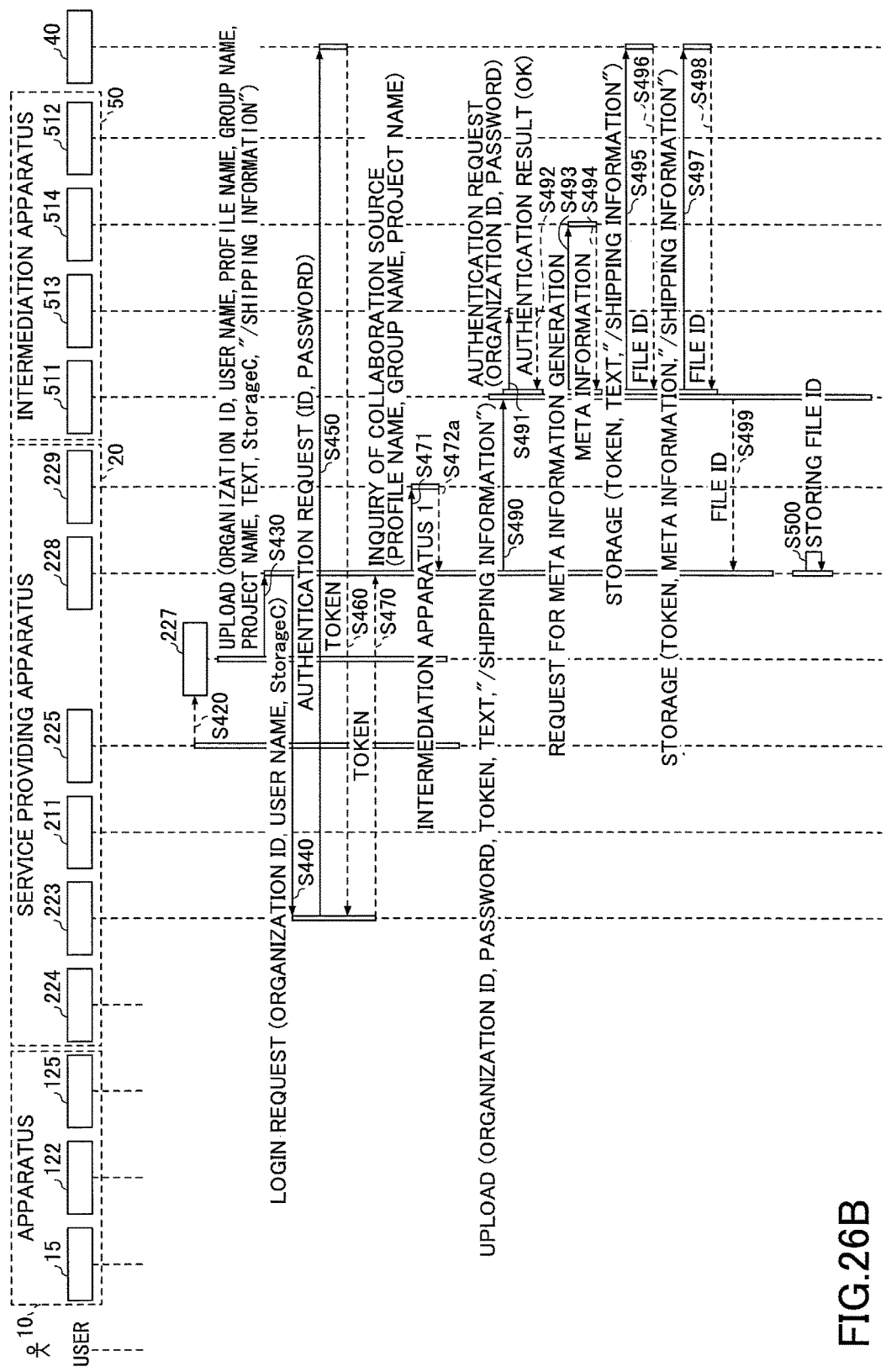

FIGS. 26A and 26B are a sequence chart for explaining a second example of the process at a time of using the ScanToStorage service. Referring to FIGS. 26A and 26B, the same reference symbols as those in FIGS. 24A and 24B are given to the corresponding portions, and explanation of these portions is omitted.

Referring to FIGS. 26A and 26B, steps S310 to S330 are replaced by steps S310a to S330a. Said differently, in step S310a, a button 812 ("shipping information") is selected on the operation screen 810 (FIG. 25). Therefore, in step S330a, the group name (hereinafter, referred to as a "target group name") and the project name (hereinafter, referred to as a "target project name"), which correspond to the button 812, and reading conditions are stored in RAM 112.

As illustrated in FIG. 18, the storage collaboration source of the project whose target project name is "shipping information" is "Intermediation apparatus 1". Therefore, in step S382a, the collaboration source determining unit 229 returns "Intermediation apparatus 1" to the scan server application 211.

Subsequently, the scan server application 211 sends a status check request to the address of "Intermediation apparatus 1" (step S383). The sending of the check request corresponds to a call of one interface in the intermediation API 53. Therefore, the status check request is received by the collaboration intermediation unit 511 of the target intermediation apparatus 50. The organization ID and the password for Intermediation apparatus 1 are designated in the status check request. The address and the password for Intermediation apparatus 1 is included in the intermediation information, which is associated with the target group name in the profile.

When the collaboration intermediation unit 511 receives the status check request, the collaboration intermediation unit 511 requests the authentication processing unit 513 to authenticate the organization ID and the password, which are designated in the status check request, to the authentication processing unit 512 (step S384). The authentication processing unit 513 authenticates the organization ID and the password based on whether a set of the organization ID and the password is stored in the organization authentication information memory unit 523.

FIG. 27 illustrates an exemplary structure of an organization authentication information memory unit included in the intermediation apparatus. Referring to FIG. 27, the organization authentication information memory unit 523 stores the organization IDs and the passwords, by which a use of the intermediation apparatus 50 is permitted. If the set of the organization ID and the password, which are designated in the status check request, is stored in the organization authentication information memory unit 523, the authentication processing unit 513 determines that the success of the authentication is the result of the authentication. If the set of the organization ID and the password is not stored in the organization authentication information memory unit 523, the authentication processing unit 513 determines that the failure of the authentication is the result of the authentication. The authentication processing unit 513 returns the result of the authentication to the collaboration intermediation unit 511 (step S385).

In a case where the result of the authentication is indicated as the failure of the authentication, the collaboration intermediation unit 511 returns an error to the status check request. In this case, step S390 and succeeding steps are ceased from being performed. In a case where the result of the authentication indicates the success of the authentication, the collaboration intermediation unit 511 inquires of the status administration unit 512 about the status of the intermediation apparatus 50. The status administration unit 512 returns the status information stored in the status information memory unit 521 (FIGS. 22A and 22B) to the collaboration intermediation unit 511 (step S387).

In step S387, the status information indicative of "running" is returned. The collaboration intermediation unit 511 returns the stats information indicative of "running" to the scan server application 211 of the service providing apparatus 20 (step S388). The scan server application 211 inputs an execution request for a job (hereinafter, referred to as "job B") into the job processing unit 225 in response to an event where the status of the intermediation apparatus 50 is "running" (said differently, the intermediation apparatus 50 can be normally used) (step S390).

In steps S400 to S472a, processes similar to steps S400 to S472 in FIGS. 24A and 24B are performed. However, for example, the storage name and the folder name, and so on of the upload destination in FIGS. 26A and 26B differ from those in FIGS. 24A and 24B because the selected projects are different between FIGS. 24A and 24B and FIGS. 26A and 26B. Further, in step S472a, the collaboration source determining unit 229 returns "intermediation apparatus 1" as the storage collaboration source to the storage collaboration unit 228.

In step S490, the storage collaboration unit 228 sends the upload request to upload the text data obtained as the result of the OCR process to the address of "Intermediation apparatus 1" through the network by designating the organization ID, the password, the token, the storage name, and the folder name based on the event where the storage collaboration source is the intermediation apparatus 50. The sending of the acquisition request corresponds to a call of one interface in the intermediation API 53. Therefore, the upload request is received by the collaboration intermediation unit 511 of the target intermediation apparatus 50 corresponding to the address.

When the collaboration intermediation unit 511 receives the upload request, the collaboration intermediation unit 511 requests the authentication processing unit 513 to authenticate the organization ID and the password, which are designated in the upload request, to the authentication processing unit 512 (step S491). The authentication processing unit 513 performs a process similar to a case corresponding to step S384 and returns the result of authenticating the organization ID and the password to the collaboration intermediation unit 511 (step S492).

If the authentication is successfully completed, the collaboration intermediation unit 511 requests the meta information generation unit 514 to generate meta information from the uploaded text data (step S493). The meta information generation unit 514 extracts a character string indicative of a value of a predetermined item from the text data and generates the meta information based on the extracted character string. The meta information is generated to have, for example, a Comma Separated Value (CSV) format. However, the meta information may be generated in another format such as an eXtensible Markup Language (XML) format. The meta information generation unit 514 returns the generated meta information to the collaboration intermediation unit 511 (step S494).

FIG. 28 illustrates an example of the meta information. Referring to FIG. 28, "Tarou Yamada" is extracted from the item of "customer information" and "2013/8/13" is extracted from the items "order date" in the text data. The extracted and the items are formed as illustrated in FIG. 28. The process corresponding to the generation of the meta data is an exemplary process inherent in the intermediation apparatus 50. For example, another process such as translation of a sentence indicated by the text data or conversion of the text data to a predetermined data format may be performed for each intermediation apparatus 50.

Subsequently, the collaboration intermediation unit 511 sends the storage request to store the text data to the online storage system 40 corresponding to the storage name designated in the upload request received in step S490 (step S495). At this time, the folder name (/shipping information) designated in the upload request is designated as the folder of the storage destination.

Subsequently, the online storage system 40 returns a response which responds to the upload request and includes information (hereinafter, referred to as a "file ID") for identifying the uploaded data in the online storage system 40 (step S496).

In subsequent steps S497 and S498, the meta information is uploaded and the file ID for the meta information is returned.

Subsequently, the collaboration intermediation unit 511 returns the file ID returned from the online storage system 40 to the storage collaboration unit 228 of the service providing apparatus 20 (step S499). Here, the file ID for the text data and the file ID for the meta information are returned. Meanwhile, only the file ID for the text data may be returned.

Subsequently, the storage collaboration unit 228 stores the returned file ID in the upload information memory unit 236 while associating the returned file ID with the information of the job of uploading the data corresponding to the file ID (step S500).

FIG. 29 illustrates an exemplary structure of the upload information memory unit. Referring to FIG. 29, the upload information memory unit 236 stores the organization ID, the storage name, the file path, the address, the password, the upload date, the file ID, or the like for each uploaded data.

The organization ID is provided for the job of uploading the data. The storage name is of the online storage system 40 of the upload destination of uploading the data. The file path is of the upload destination. In a case where it is not possible to specify the file name included in the file path on the side of the service providing apparatus 20, the file name may be returned together with the file ID in step S498. The address is of the intermediation apparatus 50 used for the upload. The password is for the intermediation apparatus 50. The upload date is when the upload is performed. For example, the date and time when the record is registered in the upload information memory unit 236 may be the upload date. The file ID is returned from the online storage system 40 of the upload destination. The organization ID, the storage name, and the file path can be specified based on information associated with the job of the upload.

Figure 30:
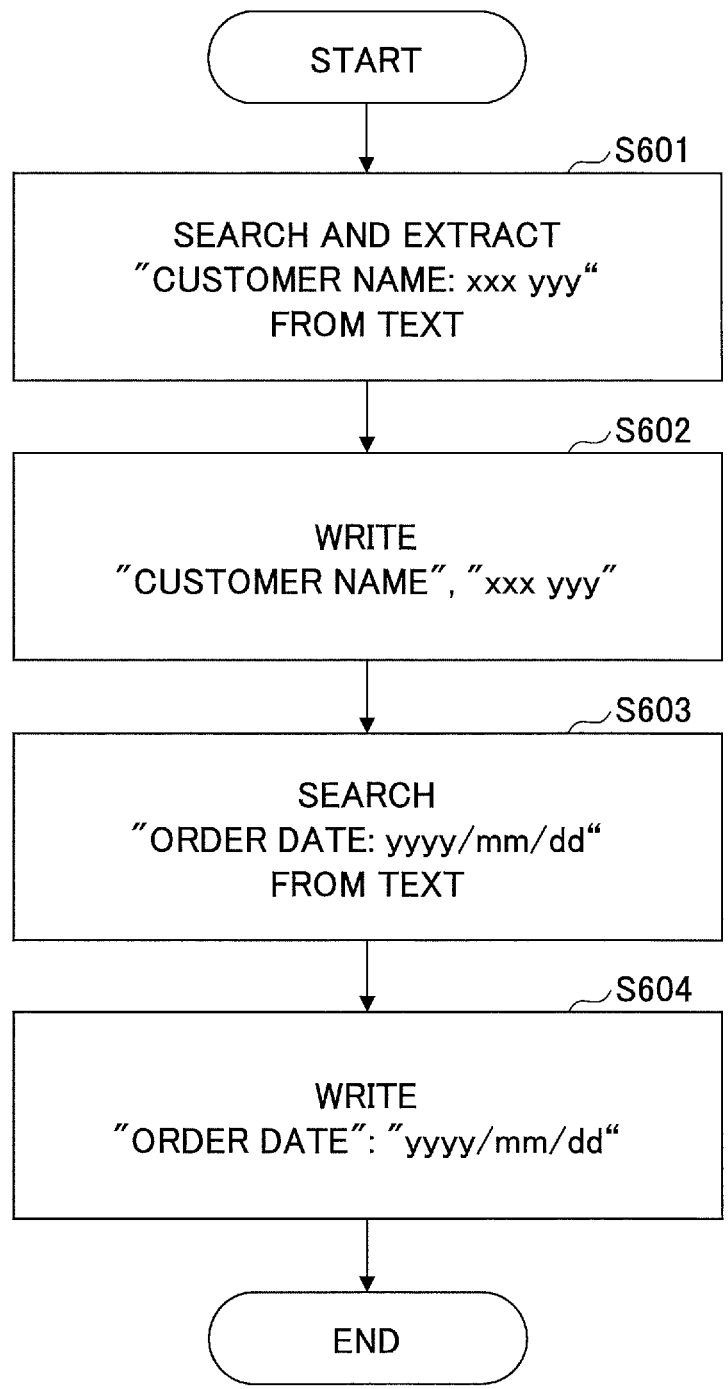
FIG. 30 is a flowchart for explaining an exemplary procedure of a generation process of the meta-information.

Subsequently, described next is a detailed procedure performed by the meta information generation unit 514 in response to a generation request to generate the meta information in step S493. FIG. 30 is a flowchart for explaining an exemplary procedure of the generation process of the meta-information.

In step S601, meta information generation unit 514 searches a character string matching a format of "customer name: xxx yyy" from the text data and extracts a part of "xxx yyy" (i.e., the given name and the surname). Said differently, it is scheduled in "shipping information" of the project to scan the original including such a character string in the apparatus 10.

Subsequently, the meta information generation unit 514 writes the character string including the extracted part into a file storing the meta information in a format of "customer name, xxx yyy" in step S602.

The meta information generation unit 514 searches a character string matching a format of "order date: yyyy/mm/dd" from the text data and extracts a part of "yyyy/mm/dd" (i.e., the year, the month, and the date). Said differently, it is scheduled in "shipping information" of the project to scan the original including such a character string in the apparatus 10.

Subsequently, the meta information generation unit 514 writes the character string including the extracted part into the file storing the meta information in a format of "order date, yyyy/mm/dd" in step S604.

According to the above procedure, the meta information illustrated in FIG. 28 is generated.

Subsequently, described is a case where the status of the intermediation apparatus 50 of the storage collaboration source is "updating", said differently, a case where the intermediation apparatus 5 cannot be used.

Figure 31A:
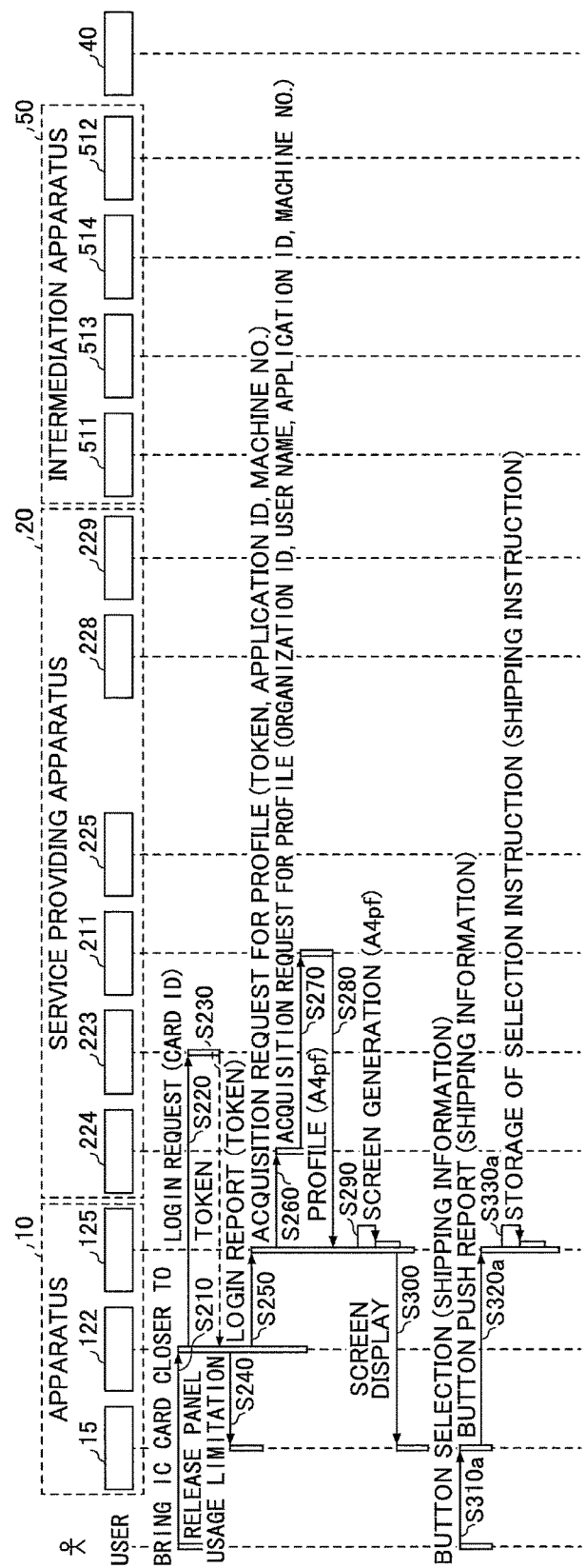

FIGS. 31A and 31B are a sequence chart for explaining a third example of the process at a time of using the ScanToStorage service. Referring to FIGS. 31A and 31B, the same reference symbols as those in FIGS. 26A and 26B are given to the corresponding portions, and explanation of these portions is omitted.

Referring to FIGS. 31A and 31B, the status information stored in the status information memory unit 521 of the intermediation apparatus 50 is as illustrated in FIG. 22B. Therefore, in step S387a, this status information is returned from the status administration unit 512 to the collaboration intermediation unit 511. Further, in step S388a, the status information is returned from the collaboration intermediation unit 511 to the scan server application 211.

The scan server application 211 returns a response indicating that the intermediation apparatus 50 is being updated and cannot be used until 11:00 of 2013/8/11 (Aug. 11, 2013) in response to an event where the status of the intermediation apparatus 50 is "updating" (said differently, the intermediation apparatus 50 cannot be used) (step S511). In response to the response, the scanning apparatus application 125 generates an alarm screen for reporting this status of the intermediation apparatus (step S512) and causes the alarm screen to be displayed on the operation panel 15. A user recognizes that the project corresponding to the button selected in step S310a cannot be used until 11:00 of 2013/8/11 by referring to an alarm screen.

Subsequently, described is a procedure performed in a case where a check request to check a status (hereinafter, referred to as an "uploaded status") of the uploaded data is input by the user.

Figure 32:
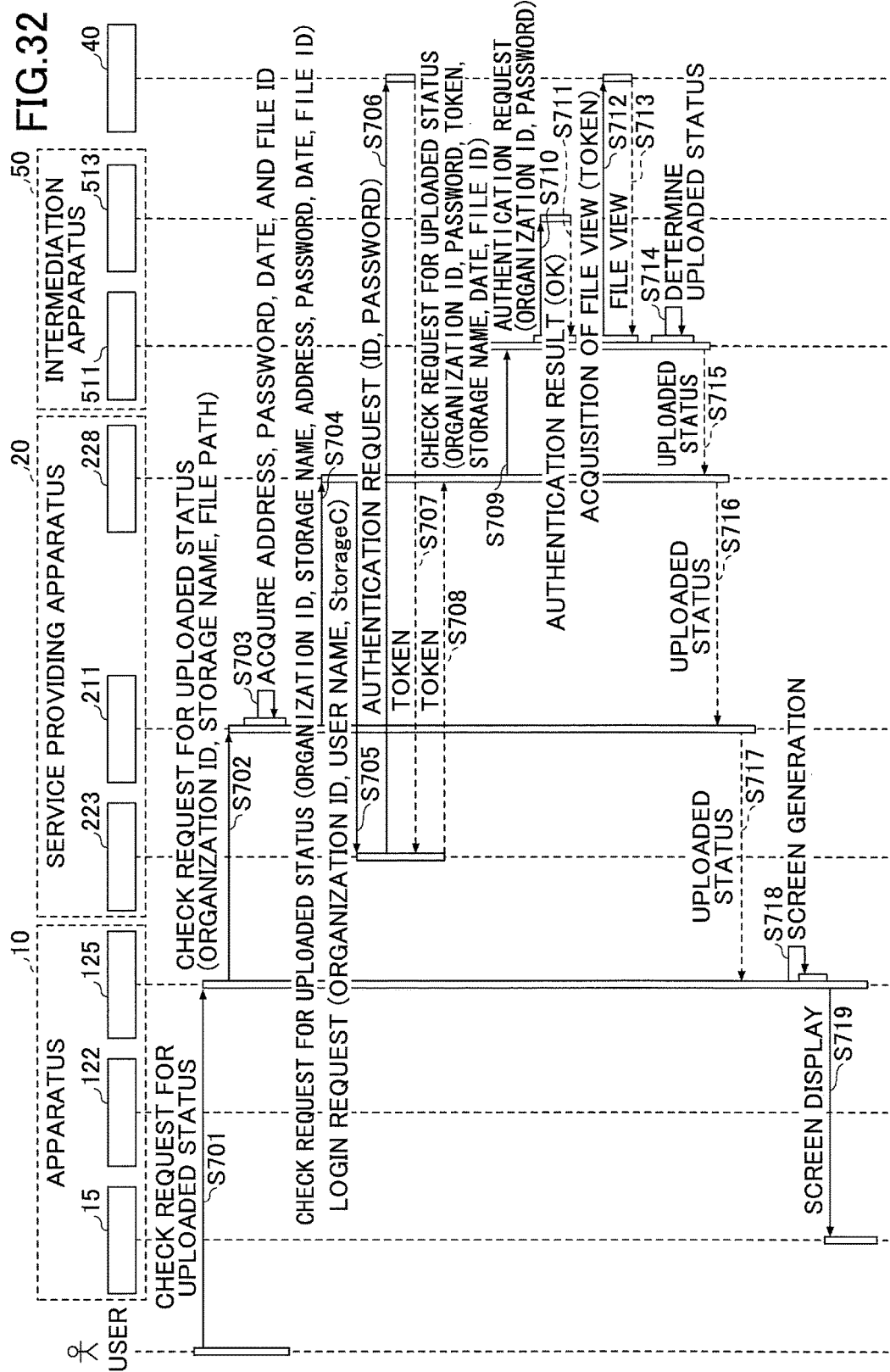
FIG. 32 is a sequence chart for explaining an exemplary procedure of a check process in an uploaded status.

FIG. 32 is a sequence chart for explaining an exemplary procedure of the check process in the uploaded status.

In step S701, data whose status is to be checked are selected from a view of the uploaded data included in, for example, a job control screen displayed by the scanning apparatus application 125. A view of the storage names and file paths for a record including the organization ID of the organization, to which the apparatus 10 to be operated, and selected from the records stored in the upload information memory unit 236 is displayed on the job control screen, for example.

Subsequently, the scanning apparatus application 125 sends the check request for the uploaded status, in which the selected storage name, the selected file path, and organization ID are designated, to the scan server application 211 (step S702). When the scan server application 211 receives the status check request, the scan server application 211 acquires the organization ID and the storage name designated in the status check request and the address, the password, the upload date, and the file ID associated with the file path from the upload information memory unit 236 (step S703).

Subsequently, the scan server application 211 requests the storage collaboration unit 228 to check the upload status by designating the organization ID, the storage name, the address, the password, the upload date, and the file ID (step S704). The address, the password, the upload date, and the file ID are acquired in step S703.

In subsequent steps S705 to S708, processes similar to steps S430 to S470 in FIGS. 24A and 24B are performed. As a result, the storage collaboration unit 228 acquires a token corresponding to the online storage system 40 corresponding to the storage name designated in the check request to check the status.

Subsequently, the storage collaboration unit 228 sends the check request to check the uploaded status to the address designated in step S709 by designating the organization ID, the password, the token, the storage name, the upload date, and the file ID (step S709). The sending of the check request to check the uploaded status corresponds to a call of one interface in the intermediation API 53. Therefore, the check request to check the uploaded status is received by the collaboration intermediation unit 511 of the target intermediation apparatus 50 corresponding to the address.

In steps S710 and S711, the organization ID and the password are authenticated in a manner similar to steps S384 and S385 of FIGS. 26A and 26B. If the authentication is successfully completed, the collaboration intermediation unit 511 sends an acquisition request to acquire the view of the files to the online storage system 40 corresponding to the storage name designated in step S709 by designating the token designated in step S709 (step S712). The files to be acquired into the view may be limited to a predetermined folders or files in their lower hierarchies (for example, the folder corresponding to the organization ID designated in step S709 or lower folders and files). The online storage system 40 returns the view of the file IDs of the files stored in the online storage system 40 in response to the acquisition request for the view of the files (step S713).

Subsequently, the collaboration intermediation unit 511 determined the uploaded status of the data selected as an object of checking the uploaded status (step S714). Specifically, in a case where the file ID corresponding to the data is included in the view of the file IDs corresponding to the data, the collaboration intermediation unit 511 determines that the uploaded status of the data corresponding to a target file ID. In a case where the target file ID is not included in the view of the received file ID, the collaboration intermediation unit 511 distinguishes the uploaded status in response to an elapsed time from the upload data to the present time. For example, in a case where the elapsed time is within a predetermined time, the collaboration intermediation unit 511 determines that the uploaded status of the data corresponding to the target file ID is "uploading". For example, in a case where the elapsed time exceeds the predetermined time, the collaboration intermediation unit 511 determines that the uploaded status of the data corresponding to the target file ID is "failure".

A method of determining the uploaded status in steps S712 to S714 depends on an API unveiled by the online storage system 40 of the upload destination or the like. For example, in a case where the online storage system 40 of the upload destination has an API performing "a return of the uploaded status of the designated file ID", the collaboration intermediation unit 511 calls the API once to know the uploaded status.

Subsequently, the collaboration intermediation unit 511 returns the result of the determination of the uploaded status to the storage collaboration unit 228 (step S715). The storage collaboration unit 228 returns the information (hereinafter, referred to as "uploaded status information") indicative of the uploaded status to the scan server application 211 (step S716). The scan server application 211 returns the uploaded status information to the scanning apparatus application 125 (step S717).

The scanning apparatus application 125 generates a screen for displaying the uploaded status information (step S718) and displays the screen on the operation panel 15 (step S719). The user refers to the screen to check the uploaded status of the designated data.

As described, according to a first embodiment, as to the image data sent from the apparatus to the service providing apparatus 20 or data generated based on the image data, the data may be intermediated by the intermediation apparatus 50 in sending (uploading) to the online storage system 40. Said differently, the service providing apparatus 20 can send the data to the online storage systems 40 having mutually different interfaces using the intermediation API 53 provided in common by the intermediation apparatus 50. As a result, it is possible to improve flexibility in sending the image data sent from the apparatus 10 or the data generated based on the image data.

Therefore, in a case where a new online storage system 40 is added as a candidate of the storage destination, it is sufficient to prepare the intermediation apparatus 50 corresponding to the online storage system 40 or to update the existing intermediation apparatus 50. Thus, it is possible to reduce necessity of adding a new implementation to the service providing apparatus 20. As a result, it is possible to reduce a frequency of stopping the service providing apparatus 20.

One intermediation apparatus 50 may correspond to (collaborate with) multiple online storage systems 40. Therefore, it is possible to reduce a cost for causing the new online storage system 40 to correspond to the intermediation apparatus 50 in comparison with a case where the correspondence relationship between the intermediation apparatus 50 and the online storage system 40 is one-on-one.

However, in a case where one intermediation apparatus 50 corresponds to the online storage system 40, it is necessary to provide an updating operation to the intermediation apparatus 50 in order to cause the existing intermediation apparatus 50 to correspond to the new online storage system 40. In this case, there is a probability that the upload of the data cannot be performed using the intermediation apparatus 50 during the update. However, by preparing the intermediation apparatus 50 for each user (each organization ID), it is possible to limit a range of influences caused along with the intermediation apparatus to a specific user.

Within this embodiment, described is the example where the collaboration destination of the intermediation apparatus 50 is the online storage system 40 for convenience. However, another computer system may be the collaboration destination of the intermediation apparatus 50.

Second Embodiment

Next, a second embodiment is described. Differences of the second embodiment from the first embodiment are described. Features of the second embodiment, which are not specifically described, may be similar to those of the first embodiment.

Figure 33:
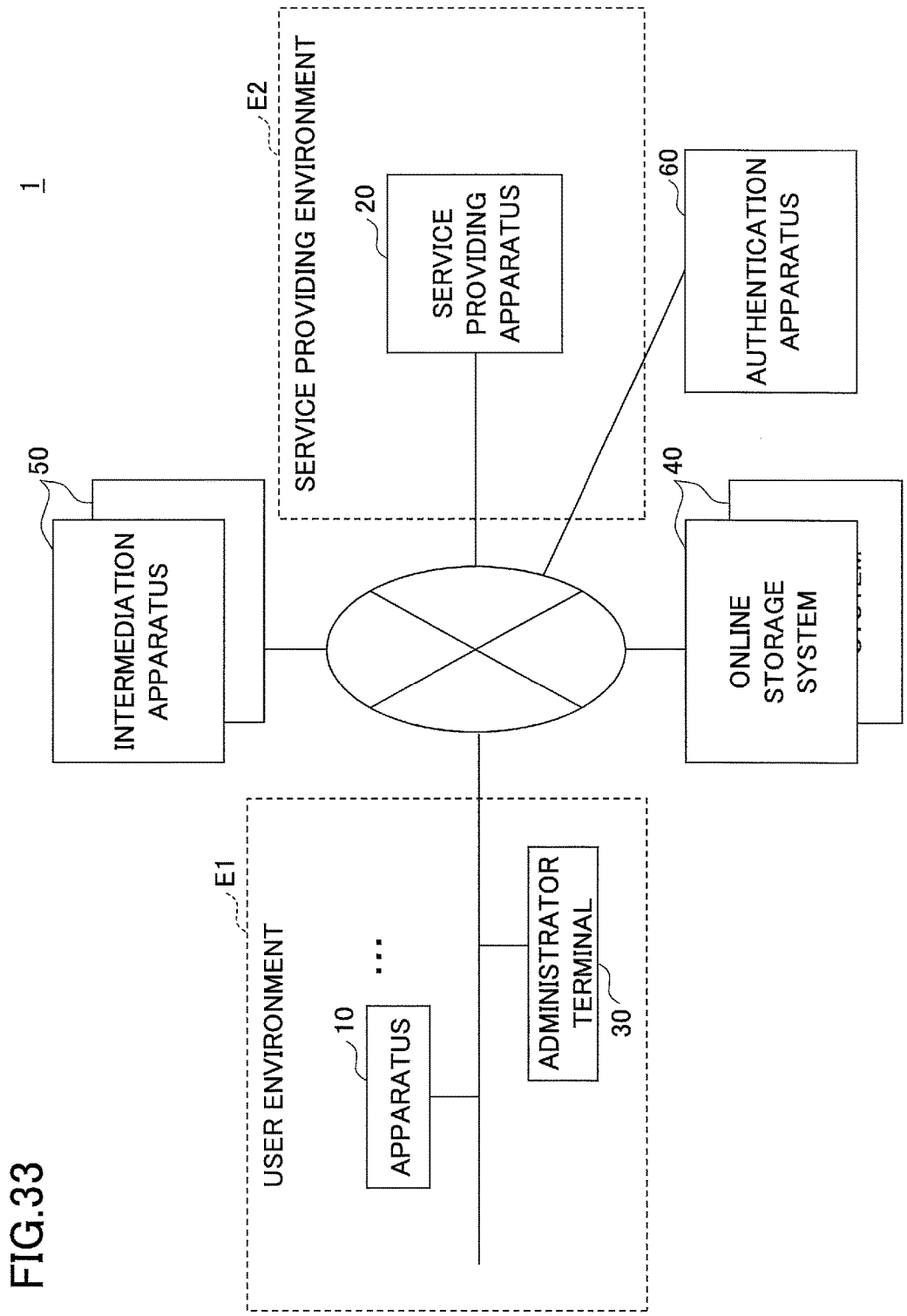
FIG. 33 illustrates an exemplary structure of the information processing system of a second embodiment.

FIG. 33 illustrates an exemplary structure of the information processing system of the second embodiment. Referring to FIG. 33, the authentication apparatus 60 is connected to the intermediation apparatus 50 so as to be communicable with the intermediation apparatus 50 through a network such as a Local Area Network (LAN) or the Internet.

The authentication apparatus 60 is a computer to unify (consolidate) the authentication to give authority of using each intermediation apparatus (intermediation API 53). Said differently, within the first embodiment, each intermediation apparatus 50 performs authentication for using the intermediation apparatus 50. Therefore, a work of registration or the like for registering into the organization authentication information memory unit 523 is required for each intermediation apparatus 50. Especially, in a case where the intermediation apparatus 50 is distributed and arranged, this work becomes more complicated.

Within the second embodiment, the authentication for giving the authority of using each intermediation apparatus 50 is alternatively performed by the authentication apparatus 60 so that the alternative authentication is unified (consolidated). Therefore, within the second embodiment, each intermediation apparatus 50 may not have the authentication processing unit 513 and the organization authentication information memory unit 523.

Figure 34:
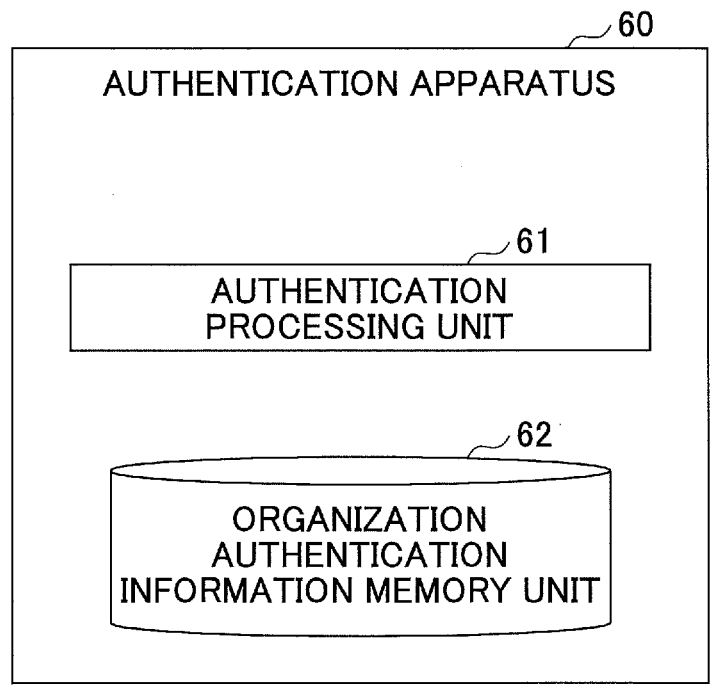
FIG. 34 illustrates an exemplary functional structure of an authentication apparatus.

FIG. 34 illustrates an exemplary functional structure of the authentication apparatus. Referring to FIG. 34, the authentication apparatus 60 includes the authentication processing unit 61, the organization authentication information memory unit 62, and so on.

The authentication processing unit 61 performs an authentication process for giving a call authority for calling the intermediation API 53. The organization authentication information memory unit 62 stores information used by the authentication processing unit 61 to authenticate an access request source of the intermediation API 53.

Figure 35A:
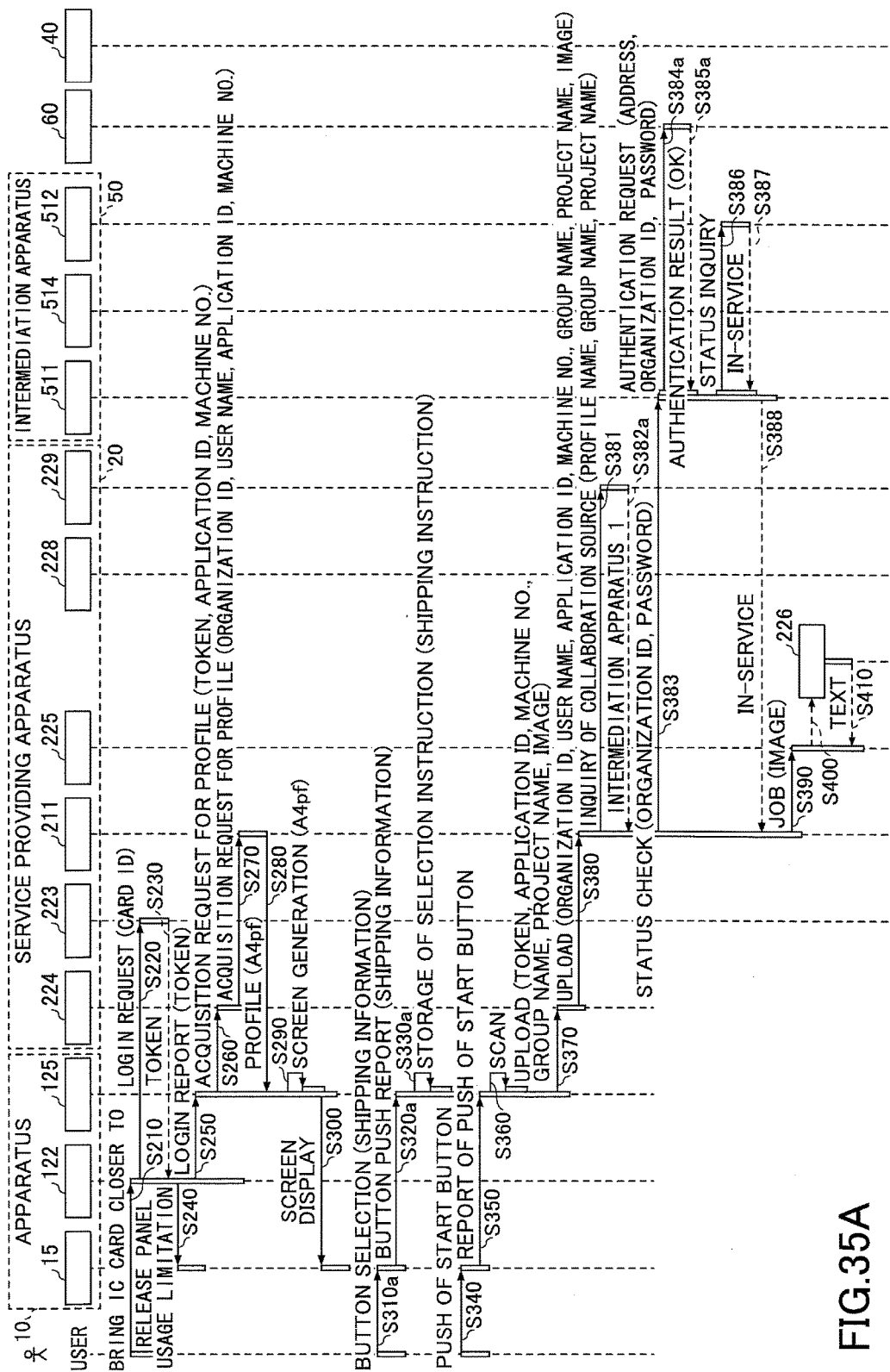
FIGS. 35A and 35B are a sequence chart for explaining a fourth example of the procedure at the time of using the ScanToStorage service.
Figure 35B:
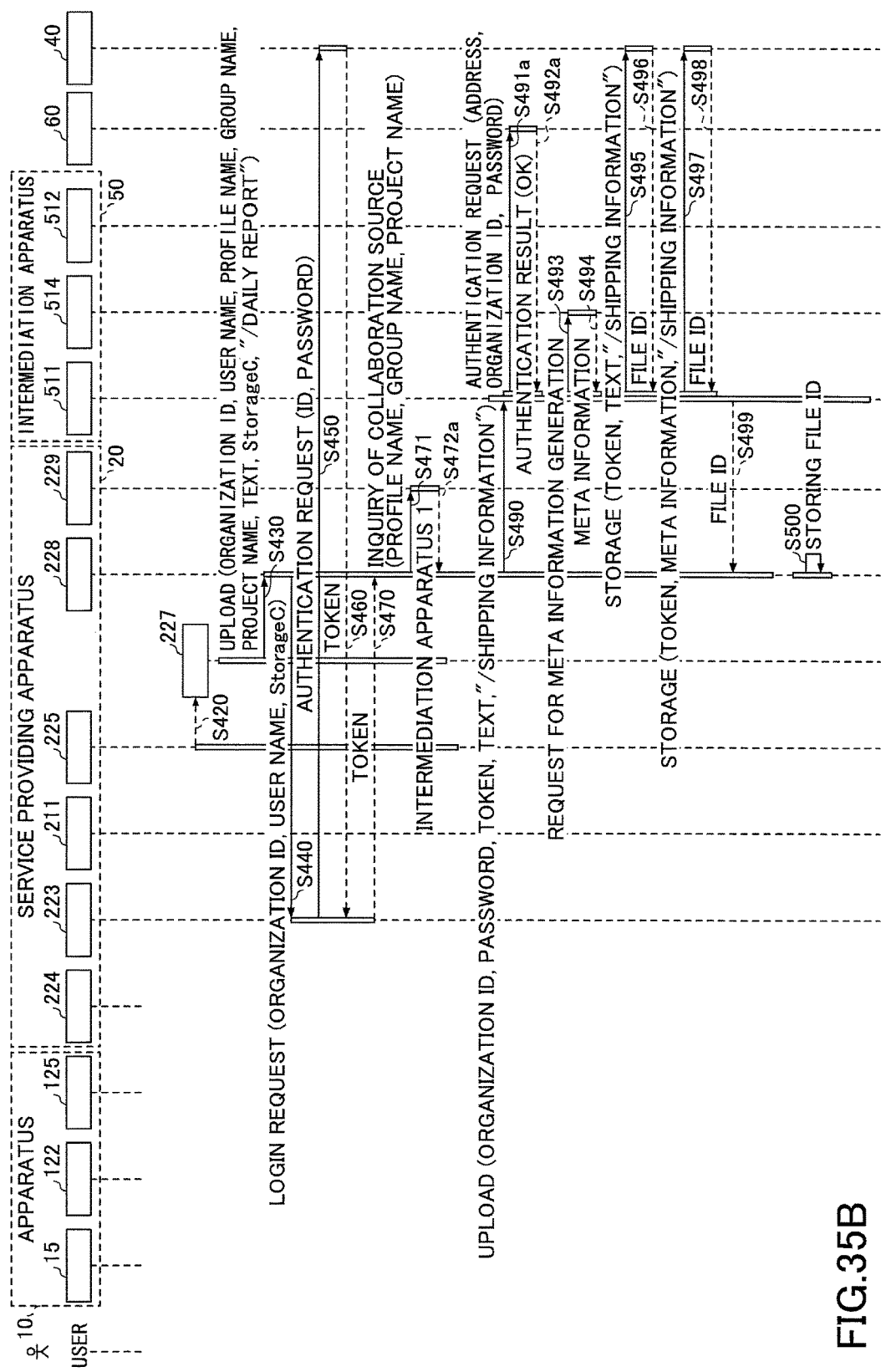

FIGS. 35A and 35B are a sequence chart for explaining a fourth example of the process at a time of using the ScanToStorage service. Referring to FIGS. 35A and 35B, the same reference symbols as those in FIGS. 26A and 26B are given to the corresponding portions, and explanation of these portions is omitted.

Referring to FIGS. 35A and 35B, steps S384 and S385 are replaced by steps S384*a* to S385*a*. Referring to FIGS. 35A and 35B, steps S491 and S492 are replaced by steps S491*a* to S492*a*.

Said differently, in step S384*a*, the collaboration intermediation unit 511 sends the organization ID designated in the received status check request and the authentication request to authenticate the password to the authentication processing unit 61 of the authentication apparatus 60. In addition to the organization ID and the password, the address of the intermediation apparatus 50 is designated as the identification information of the intermediation apparatus 50. Other than the address may be used as the identification information of each intermediation apparatus 50.

The authentication processing unit 61 of the organization ID and the password based on whether a set of the address, the organization ID, and the password designated in the authentication request is stored in the organization authentication information memory unit 62.

FIG. 36 illustrates an exemplary structure of the organization authentication information memory unit included in the authentication apparatus. Referring to FIG. 36, the organization authentication information memory unit 62 stores the organization IDs and the passwords, by which a use of the intermediation apparatus 50 corresponding to each address is permitted. If the set of the address, the organization ID and the password, which are designated in the authentication request, is stored in the organization authentication information memory unit 62, the authentication processing unit 61 determines that the success of the authentication is the result of the authentication. If the set of the address, the organization ID, and the password is not stored in the organization authentication information memory unit 62, the authentication processing unit 513 determines that the failure of the authentication is the result of the authentication. The authentication processing unit 61 returns the result of the authentication to the collaboration intermediation unit 511 (step S385*a*).

The contents of processing steps S491*a* and S492*a* are similar to the contents of processing steps S384*a* and S385*a*.

As described above, within the second embodiment, the information required to be administrated for the authentication for giving the authority of using the intermediation apparatus 50 is consolidated into the organization authentication information memory unit 62 of the authentication apparatus 60. Therefore, a load of a maintenance work for the information can be reduced.

The above embodiments describe the ScanToStorage service, in which the input source of the image data is a scanner. However, the input source of the image data may be other than the scanner. The input source of the image data is, for example, a digital camera (including a portable terminal having a digital camera function), a whiteboard, or the like. In the case of the digital camera, the image data captured by the digital camera is input. In the case of the whiteboard, the image data written on and read by the whiteboard is input.

Further, electronic data other than image data may be input. For example, audio data recorded by an IC recorder or document data produced by a Personal Computer (PC) or the like may be input.

As illustrated in FIG. 4, in addition to the apparatus 10, the portable terminal, the PC, the meeting system, the image projection apparatus, the IC recorder, and other new devices may be connected to the service providing apparatus 20 through the network.

Within the embodiments, the service providing apparatus 20 and the intermediation apparatus 50 is an example of an information processing system. The receiving unit is substantialized by, for example, the CPU 204 in which the scan server application 211 is run. The group name and the project name corresponding to the profile is an example of the specifying information. This is because the online storage system 40 and the intermediation apparatus 50 are specified based on the storage collaboration information or the storage collaboration source 50 corresponding to the group name and the project name. An intermediation unit is an intermediation unit 511 substantialized by, for example, a CPU. A requesting unit is the storage collaboration unit 228 substantialized by, for example, the CPU 204. The service providing apparatus 20 is an example of a first information processing apparatus. The intermediation apparatus 50 is an example of a second information processing apparatus and an external apparatus.

It is possible to improve flexibility in sending data sent from the apparatus to the storage destination.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an information processing system has been described in detail, it should be understood that various changes, substitutions, and alterations could be made thereto without departing from the spirit and scope of the invention.

This application is based upon and claims the benefit of priority of the prior Japanese Patent Application No. 2013-223959, filed on Oct. 29, 2013, and the Japanese Patent Application No. 2014-215400, filed on Oct. 22, 2014, the entire contents of which are incorporated herein by reference.

What is claimed is:

1. An information processing system including at least one computer, the information processing system comprising:
   a service providing apparatus configured to:
      receive image data input by an apparatus connected through a network and specifying information that specifies a specified storage destination of the image data or meta information, which is generated from text data extracted from the image data using optical character recognition, from a plurality of candidate storage destinations, the image data and the specifying information being received from the apparatus; and
   an intermediation apparatus configured to:
      provide a common interface that is common to the plurality of candidate storage destinations,
      extract a character string indicative of a value of a predetermined item from the text data, and
      generate the meta information based on the extracted character string, and send the meta information to the specified storage destination designated in a request received through the common interface, wherein
   the service providing apparatus is configured to generate the request to send the received image data or the generated meta information to the specified storage destination using the common interface.

2. The information processing system according to claim 1,
   wherein the intermediation apparatus includes a plurality of intermediation apparatuses,
   wherein the specifying information specifies one intermediation apparatus among from the intermediation apparatuses and the specified storage destination corresponding to the one intermediation apparatus,
   wherein the service providing apparatus requests the one intermediation apparatus, which is associated with the specified specifying information, to send the image data or the meta information to the specified storage destination.

3. The information processing system according to claim 1,
wherein the intermediation apparatus stores a correspondent relationship between the intermediation apparatus and the candidate storage destinations,
wherein the service providing apparatus requests the intermediation apparatus having the correspondence relationship with the specified storage destination to send the image data received by the service providing apparatus or the generated meta information to the specified storage destination.

4. The information processing system according to claim 3,
wherein the intermediation apparatus stores the correspondence relationship between the intermediation apparatus and the candidate storage destinations for each user information identifying a user,
wherein the service providing apparatus receives user information from the apparatus,
wherein the service providing apparatus requests the intermediation apparatus having the correspondence relationship with the specified storage destination in association with the received user information to send the received image data or the generated meta information to the specified storage destination.

5. An information processing system including a first information processing apparatus and a second information processing apparatus,
wherein the first information processing apparatus includes
a first hardware processor which executes a first program to cause the first information processing apparatus to:
receive image data input by an apparatus connected through a network and specifying information that specifies a specified storage destination of the image data or meta information, which is generated from text data extracted from the image data using optical character recognition, from a plurality of candidate storage destinations, the image data and the specifying information being received from the apparatus, and
generate a request to send the received image data or the meta information generated based on the image data to the specified storage destination, the request being sent to the second information processing apparatus, using a common interface that is common to the plurality of candidate storage destinations,
wherein the second information processing apparatus includes
a second hardware processor that executes a second program to cause the second information processing apparatus to:
provide the common interface,
extract a character string indicative of a value of a predetermined item from the text data,
generate the meta information based on the extracted character string, and
send the meta information to the specified storage destination designated in the generated request.

* * * * *